(12) United States Patent
Franck et al.

(10) Patent No.: US 9,560,702 B2
(45) Date of Patent: Jan. 31, 2017

(54) LIGHT SOURCE MODULE, POWER SUPPLY UNIT FOR OPERATING A LIGHT SOURCE MODULE OF THIS KIND, AND LIGHTING SYSTEM

(71) Applicant: OSRAM GmbH, Munich (DE)

(72) Inventors: Felix Franck, Munich (DE); Markus Heckmann, Munich (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/029,715

(22) PCT Filed: Sep. 24, 2014

(86) PCT No.: PCT/EP2014/070415
§ 371 (c)(1),
(2) Date: Apr. 15, 2016

(87) PCT Pub. No.: WO2015/055396
PCT Pub. Date: Apr. 23, 2015

(65) Prior Publication Data
US 2016/0270167 A1 Sep. 15, 2016

(30) Foreign Application Priority Data

Oct. 16, 2013 (DE) .......................... 10 2013 221 033

(51) Int. Cl.
*H01J 7/24* (2006.01)
*H05B 33/08* (2006.01)

(52) U.S. Cl.
CPC ...... *H05B 33/0812* (2013.01); *H05B 33/0827* (2013.01); *H05B 33/0851* (2013.01); *H05B 33/0884* (2013.01)

(58) Field of Classification Search
CPC .............. H01J 7/24; H01J 61/52; H01J 13/32; H01J 61/523; H05B 41/26; H05B 41/00
(Continued)

(56) References Cited

U.S. PATENT DOCUMENTS 7,626,346 B2 12/2009 Scilla
8,456,109 B1 * 6/2013 Wray ................. H05B 33/0824
315/209 R (Continued)

FOREIGN PATENT DOCUMENTS

CN 201462725 U 5/2010
DE 10051528 A1 5/2002
(Continued)

OTHER PUBLICATIONS

International Search Report based on Application No. PCT/EP2014/070415 (4 Pages and 3 Pages of English tanslation) dated Feb. 20, 2015 (Reference Purpose Only).
(Continued)

*Primary Examiner* — Minh D A
(74) *Attorney, Agent, or Firm* — Viering, Jentschura & Partner mbB

(57) ABSTRACT

A light source module may include at least one LED cascade with a plurality of LEDs, a supply line, wherein at the input side the LED cascade is coupled thereto, and a ground line. The light source module further includes a communications line for coupling to a control device for the current to be provided by the current source, a thermal derating unit coupled between a first voltage source and the communications line and including a temperature-sensitive element, wherein the thermal derating unit applies a temperature dependent current component determined depending on the temperature-sensitive element, to the communications line, at least one current measurement resistor connected in series between the LED cascade and the reference potential, wherein the conductance of the current measurement resistor is proportional to the current requirement of the LED cascade, and at least one coupling resistor coupled between the coupling point and the communications line.

20 Claims, 10 Drawing Sheets

(58) Field of Classification Search
USPC .................. 315/291, 150, 307, 312, 185 R, 209 R,315/112, 113, 115, 117
See application file for complete search history.

(56) References Cited

U.S. PATENT DOCUMENTS

| | | | |
|---|---|---|---|
| 8,674,610 B2 * | 3/2014 | Briggs | ............... H05B 33/0818 315/152 |
| 2005/0045802 A1 | 3/2005 | Niemann et al. | |
| 2008/0224634 A1 | 9/2008 | Scilla | |
| 2011/0210675 A1 | 9/2011 | Hamamoto et al. | |
| 2012/0181950 A1 | 7/2012 | Yu et al. | |
| 2015/0145437 A1 | 5/2015 | Limmer et al. | |
| 2015/0195877 A1 | 7/2015 | Angelin et al. | |
| 2015/0195884 A1 | 7/2015 | Angelin et al. | |

FOREIGN PATENT DOCUMENTS

| | | |
|---|---|---|
| DE | 102009022070 A1 | 11/2010 |
| DE | 102011087658 A1 | 6/2013 |
| DE | 102012224348 A1 | 1/2014 |
| DE | 102012224349 A1 | 1/2014 |
| EP | 1874097 A1 | 1/2008 |
| JP | 2006012622 A | 1/2006 |
| WO | 0148495 A1 | 7/2001 |
| WO | 2012164440 A1 | 12/2012 |
| WO | 2013064973 A1 | 5/2013 |

OTHER PUBLICATIONS

German Search Report based on Application No. 10 2013 221 033.7(7 Pages) dated Jul. 7, 2014 (Reference Purpose Only).

* cited by examiner

LIGHT SOURCE MODULE, POWER SUPPLY UNIT FOR OPERATING A LIGHT SOURCE MODULE OF THIS KIND, AND LIGHTING SYSTEM

RELATED APPLICATIONS

The present application is a national stage entry according to 35 U.S.C. §371 of PCT application No.: PCT/EP2014/070415 filed on Sep. 24, 2014, which claims priority from German application No.: 10 2013 221 033.7 filed on Oct. 16, 2013, and is incorporated herein by reference in its entirety.

TECHNICAL FIELD

Various embodiments generally relate to a light source module including at least one LED cascade with a plurality of LEDs connected in series, a supply line for coupling to a current source, wherein at the input side the LED cascade is coupled to the supply line, and a ground line for coupling to a reference potential. It also relates to a power supply unit for operating at least one light source module of this kind as well as a lighting system including a power unit of this kind as well as at least one light source module of this kind.

Various embodiments relate to the field of solid state lighting, i.e. to general lighting mainly or exclusively through LEDs. In particular, it relates to a self-setting power supply unit for supplying at least one light source module.

In many areas of application, lighting components which are based on semiconductor light sources, for example LEDs, provide an interesting alternative to traditional fluorescent, high-pressure discharge or incandescent bulbs. Based on their design principle LEDs not only exhibit a high conversion efficiency, a high optical efficiency, a long anticipated service life and low operating costs, but also many other advantages. In some applications an LED-based lighting system may include a power supply unit which supplies an LED operating current for a plurality of light source modules, each of which in turn includes at least one LED. For example, a light source module may include a circuit carrier, more particularly a printed circuit or a printed circuit board (PCB) on which the at least one LED is mounted. Such circuit carriers can be inserted into tracks of a lamp or in sockets of a main carrier on which the power supply unit may be located.

In various applications or installations of an LED-based lighting system the number of required LEDs or light source modules will differ in each case. For example the number of LEDs or light source modules has to be adapted to the required light emitting power of a particular installation. In general the value of the LED operating current supplied by a power supply unit has to be adapted to the number of LEDs or light source modules to be supplied by this power supply unit. If a single power supply unit is to be used in a plurality of LED-based lighting systems with differing numbers of LEDs or light source modules, the power supply unit must include a device for setting the nominal value of the LED operating current which adjusts the operating current requirements to the different light source modules in accordance with the differing number of light sources or types of light sources they contain.

At present, the number of LEDs and light source modules to be contained in a particular LED-based lighting system is determined at the time of the manufacturing of this LED lighting system. If the same power supply unit is to be used in different LED lighting systems with differing numbers of light source modules, the power supply unit must be programmed to the envisaged LED lighting system at the time of manufacturing so that the supplied LED operating current is suitable for the determined number of light source modules contained in the envisaged LED lighting system.

As soon as during the longer service life of an LED-based lighting system a light source module with a shorter service life has to replaced, the problem on which this invention is actually based arises: progress at the LED component level is currently so great that a light source module of the same kind emits considerably more light or requires considerably less power for the same emitted light, if, for example, it is three years younger than the comparison module. In the above consideration it is therefore not only the specification available at the time of manufacturing of the lighting system that plays an essential role, but also the actual time of intervention in the lighting system.

BACKGROUND

This problem is addressed with the setting up of data exchange between the power supply unit and light source module. Data exchange here means that the light source module transmits some information to the power supply unit relating to the current required by the module to meet its optical specifications or operating temperature for the purpose of reducing the value of the supplied current on exceeding a certain temperature limit value. Various ways are known for exchanging this information between the light source module and the power supply unit.

Buses can be used for exchanging data. Known, for example, are analog buses such as the 1 . . . 10 V interface or digital buses such as DALI (Digital Addressable Lighting Interface). Other known methods are simple resistor networks, which can be measured by the power supply unit and send to it the current requirement of the presently connected light source module or the presently connected light source modules.

DE 100 51 528 A1 discloses an interface of this kind in which a special resistor, known as a current setting resistor, is connected between a third line and the negative supply line. If several light source modules are connected to a single power supply unit, the resistors are connected to each other in series or in parallel, and in this way a sum signal is returned to the power supply unit in order to define the total current requirement. German patent application 10 2011 087 658.8 also discloses resistors for defining the current requirement of each individual light source module, i.e. module-specific current setting resistors.

The bus solutions have the drawback of two additionally required connection lines. The resistor solutions only require one additional connection line, but the evaluation of the resistor network and the resulting setting of the current value can become very complicated.

Since complete lighting systems including a power supply unit and light source module(s) have appeared on the market, many companies are attempting to follow a common path for bringing about communication between the two components of the above systems; equally for more complex high-end systems some digital protocols are being used, though the latter technology is not the background of the present invention and must be treated separately.

For example, the company Osram has already proposed an interface which is also able to provide support to an active circuit for thermal derating on a light source module. In this type of interface a current setting resistor on the light source module in connection with a pull-up resistor in the power supply unit forms a voltage divider with the aim of producing a midpoint voltage, which defines the output current of the power supply unit. An operational amplifier on the light source module starts to limit this midpoint voltage, and thereby the supplied operating current, as soon as the module overheats.

The company Philips has proposed another interface in which one signal line is connected to the current setting resistor and another signal line is connected to a temperature-sensitive resistor, and in which thermal derating is carried out by the power unit itself without requiring any active component on the light source module.

Both the aforementioned interfaces require a third additional line for the common signal mass feedback and use a voltage produced by the current setting resistor on the light source module for setting the nominal operating current value in that the operating current is set higher with increasing voltage over the current setting resistor or current setting resistors.

Recently the company Osram presented a slightly modified interface which is based on the aforementioned 1 . . . 10V bus but is modified by way of a precision power source in the power supply unit which makes it possible to achieve a precise nominal operating current value with just one simple current setting resistor per light source module. A further modification of this interface consists in replacing the current setting resistors on the light source modules with Zener diodes.

A new challenge is currently crystallizing out on the market, namely the possibility of connecting in parallel various modules and their common supply through one and the same power supply unit. The operating current supplied by this power supply unit must correspond to the sum of the nominal current values of all light source modules currently connected thereto, and the thermal derating capability must also be retained in multi-module arrangements. A thermal derating signal on a data line should ultimately even be dominant over a total current setting signal.

Nonetheless it is necessary to make the lighting systems simpler, which at present leads to a reduction in the number of additional data lines. Bus-based interfaces require at least four lines, two for the light source module operating current and at least two for the bus.

New properties for fulfilling the tasks are being considered:
  Several modules should be able to be connected in parallel and supplied by one and the same power supply unit using the same interface. Through this the individual modules or at least those with identical operating voltages are considered as identical.
  The interface for setting the operating current should have a reduced number of lines and for reasons of cost should be as simple as possible, in particular on the light source modules side.

All previously presented and known interfaces are not able to correctly support multiple connections of light source modules. The evaluation circuits for the interface are also costly to produce.

In connection with this, the applicant has, for example in the unpublished document DE 10 2012 224 348.8, application date 21.12.2012, proposed a power unit and a light source module which have a simple interface for setting the current which is to be applied to the light source module. As said document has not yet been published, for the derivation of the object of the present invention, reference will initially be made below to the principles cited in said patent application. FIGS. 1 to 7 contained in the appendix and the associated description originate from said patent application. For the sake of clarity the corresponding digital embodiments will only be included in the disclosure content of the present application through reference.

The concept behind the invention set out in DE 10 2012 224 348.8 is always a three-line interface or an "analog one-wire interface" to which a light source module or several light source modules can be connected in parallel and connected to a single power supply unit, and the current requirements of each light source module are met in real time. The presented circuit configurations use a setting resistor in order to define a current value. For measuring this setting resistor various examples of forms of embodiment are described.

FIG. 1 shows the general concept of the setting resistors for the nominal operating current values. Three light source modules LEM are shown which are connected to a single power supply unit PSU. The connection consists of three lines: a supply line LED+, a common ground line LED− and a communications line CL. Each light source module LEM contains at least one LED chain. The LED chain includes a plurality of LEDs. According to the invention a plurality means that at least two LEDs are connected in series. Each light source module or each LED chain contains an individually allocated setting resistor for defining the nominal operating current valid in each case, known as the current setting resistor Rsetx. The current setting resistor Rset1 connects, or the current setting resistors Rset1, Rset2, Rsetm connect the common ground line LED− to the communications line CL outside a power supply unit PSU. This results in the parallel connection of all current setting resistors Rset1, Rset2, Rsetm present in the system so that the power supply unit PSU measures the equivalence resistor Rset of this parallel circuit. The concept means that the power supply unit PSU does not read a voltage as in the prior art, but a current that represents the conductance of this equivalence resistor. An inverse law is then applied to the value of the equivalence resistor in order to specify the value of the LED operating current to be supplied by the power supply unit. The law is as follows:

$$Iout = \frac{Kv}{Rset}.$$

Kv has the dimension of a voltage. Rset is the value formed by a current setting resistor Rset1 or through the parallel connection of several current setting resistors Rset1, Rset2, Rsetm. As a result the value of the operating current supplied by the power supply unit is inversely proportional to the current setting resistor Rset1 or equivalence resistor Rset of the at least one light source module, i.e. the lower the ohm value of the equivalence resistor, the higher the output current of the power supply unit PSU. The requirement for the value of the operating current to ultimately correspond to the total of the nominal current values of each individual light source module is fulfilled by the known Ohm's law per se.

FIG. 2 shows a conceptual circuit diagram of an interface with thermal derating capability. Very simple thermal derating is achieved through placing a PTC element in series with Rset.

As soon as the temperature of the light source module LEM increases, the resistance value of the PTC increases and leads to a lower nominal current value for this module. The disadvantage of such an arrangement is that it will not be suitable for multiple connection of light source modules as the effect of a heated, solitary PTC would only remove the contribution of its assigned heated module from the conductance of the parallel-connected current setting resistors Rset, which is not sufficient for effectively reducing the temperature of the affected light source module. The colder current setting resistors connected in parallel counteract the temperature-related increase in resistance of an individual current setting resistor. The dominant nature of thermal derating is therefore not guaranteed.

Nevertheless, such a solution could be used for very inexpensive applications if a partial current reduction in the case of a temperature increase is still acceptable, for example in the case of light supply modules being supplied by at least one power supply unit or good thermal coupling between the light source modules. In addition, a simple thermosensitive element in series with the current setting resistor has the disadvantage of reducing its conductance and thus the value of the light source module current continuously, quasi linearly or gradually without defining a precise initiation point for thermal derating, even if certain PTC elements exhibit a very steep behavior around their nominal trigger temperature. The "nominal" current setting would thus be corrupted by a "parasitic" effect of the derating element.

FIG. 3 shows the concept of the three-line interface with a thermal derating unit TDU on the light source module. This concept is based on a different approach, namely providing a current source for the thermal derating unit TDU on the light source module. This current source is temperature controlled by way of a suitably connected thermosensitive element and, in order to avoid additional lines for the interface, is supplied with the required auxiliary power either directly by the supply line LED+ or from a center tap from the at least one LED chain of the light source module in question. The current source includes an amplifier and a temperature-sensitive resistor through which flows an input current for the amplifier which amplifies this input current to current $I_{TDU}$ of the current source. This current source has a response threshold which prevents any generation of a current $I_{TDU}$ until a particular excess temperature of the light source module is reached. Through this an increase in the amplified current with temperature (gradient of $I_{TDU}$) is steep enough to successfully restrict the maximum temperature of a single overheated light source module in an entire system consisting of a power supply unit and several thermally independent light source modules without triggering instabilities due to heat transfer time displacements.

The current source for the current $I_{TDU}$ is capable of completely deactivating the signal formed by the equivalence resistor Rset of all parallel-connected current setting resistors: in this way it can reliably protect the entire system and, in particular, the light source module on which it is integrated, even in the case of a multiple connection of light source modules with simultaneous greatly concentrated overheating.

With the above-described temperature-dependent current source a further problem arises. It is necessary to measure the resistor Rset of module no. x independently of the actual temperature of module x, hence independently of the current supplied by the current source. It must be determined how the resistor Rset is to be measured in order to make the effect of the current source predictable. In the circuit configuration according to the invention a fixed voltage source Vk is used in order to measure the resistance value in that the circuit configuration applies the voltage of the voltage source via the current setting resistor Rset (or the parallel connection of several current setting resistors Rset) and reads the current flow brought about thereby. The voltage of the voltage source is thus emitted on the terminal for the communications line CL on power supply unit side. This in turn brings the thermal derating unit TDU into direct interaction with the current defined by Vk/Rset and resolves the ultimately set task of dominant thermal derating.

FIG. 4A shows a first variant of the light source module that provides the interface with just one bipolar transistor, an NTC element and some added resistors.

The circuit contains a voltage source V1 which is derived from the supply line LED+ of the light source module.

LEDs have a fairly stable forward voltage so that they can be used as an adequate voltage source replacement. In dependence on the supply voltage required for the thermal derating unit TDU the voltage source V1, always in relation to the common ground line LED−, can be connected to a tap between two sections of the plurality of series-connected LEDs. This means that the voltage V1 can be set in a way corresponding to a multiple of the forward voltage of an individual LED. In parallel to this voltage V1 there is a series connection of the NTC and a threshold resistor Rthr. The base of an NPN bipolar transistor (BJT) Q1 is connected to the node between the NTC and a resistor Rthr. The collector of Q1 is connected to the voltage V1. The emitter of Q1 coupled to the communications line CL via an emitter resistor Rtg. All the components of FIG. 4A described so far form the thermal derating unit TDU. The at least one current setting resistor Rset is connected between the communications line CL and the common ground line LED−.

In this circuit the emitter potential of Q1 is increased to a voltage (here Vk) determined by the power supply unit PSU, through which the threshold is reached, below which no current $I_{TDU}$ is injected into the communication line CL. If the temperature increases, the NTC starts to raise the base potential of Q1 until the NPN transistor Q1 reaches the active range.

As of now the emitter resistor Rtg defines the gain of the thermal derating unit TDU and thus the increase in injected current $I_{TDU}$ via the increase in temperature.

In relation to the voltages V1 and Vk the resistor Rthr and the resistance value of the NTC at the temperature specified as the trigger threshold for the TDU determine the initiation point for thermal derating. A further advantage of this arrangement is the good achievable linearity of the current $I_{TDU}$ over the temperature.

One of the most interesting advantages of this circuit configuration, in addition to the simplicity of its implementation on the part of the light source module, is, through setting the desired accuracies and features solely through the corresponding circuit complexity of the interface on the power supply unit side, that it is suitable for use in systems of different quality levels. In other words, it is possible to expand the read interface on the power supply unit side in accordance with the required precision and/or further necessary features.

FIG. 4B shows, as a second form of embodiment of the interface on the light source module LEM side, a complementary implementation. Here, a PNP bipolar transistor Q2 is used together with a PTC. A PTC is a temperature-sensitive resistor with a positive temperature coefficient. As in FIG. 4A, the voltage V1 is either derived from the total number of series-connected LEDs or from a part thereof. In contrast to the variant shown in FIG. 4A, the collector of Q2 forms the current source connection with the current $I_{TCU}$ which is connected to the CL. In this way the thermal derating threshold is no longer dependent on Vk, but now only on the easily reproducible voltage V1 as well as the values of the voltage divider formed by the temperature-sensitive resistance value of the PTC and the threshold resistor Rthr. As in FIG. 4A, the emitter resistor Rtg determines the gain of the thermal derating unit TDU.

No further figure is required to explain that in the event of changing the sequence of the elements in the voltage divider which defines the activation threshold temperature, the complementary bipolar transistor in accordance with FIG. 4A or FIG. 4B is used in each case. Of particular interest is the combination of a PNP transistor connected to V1 in conjunction with an NTC which is connected to the base of the transistor and the common ground line LED−.

As can be seen from FIG. 5, a first control circuit RK1 provides the nominal current value in the form of the voltage $V_{out}$. For adjusting the voltage $V_{out}$ current information is evaluated in the form of the current $I_{CL}$, which is determined as a function of the resistor $R_{sct}$. A second control circuit, designated RK2 and not shown in detail, is for controlling the actual current value $I_{out}$, wherein for this purpose the voltage $V_{mess}$ which decreases over a measuring resistor $R_{mess}$ is compared with the voltage $V_{out}$. A typical value of $I_{out}$ is, for example, 500 mA, whereas the measuring resistor $R_{mess}$ can be 2Ω, for instance. FIG. 5 shows a very simple variant of the circuit configuration of the interface for simpler power supply units PSU in which high precision is not required.

Due to the requirement for as few connection lines as possible and the concept of a common ground line LED−, the problem arises of a voltage decrease on this common ground line caused by the operating current of the at least one light source module. The embodiment uses a very simple circuit based on a single operational amplifier without any equalization of a voltage offset on the common ground line due to the light source module current. Said single operational amplifier OpAmp of the power supply unit interface is at its inverting input connected to the communications line CL and at its non-inverting input connected to the already known voltage $V_k$, which due to its direct relationship to the common ground line LED− forms the reference for the interface circuit of the power supply unit PSU. The amplifier output is connected via the current measurement resistor $R_{fb}$ to the inverting input through which the obligatory negative feedback of the operational amplifier is achieved. Its property of wanting to match the potential of both its inputs produces the reference voltage $V_k$ on the communications line CL. As both its inputs exhibit very high ohmic values, practically no currents flow there. Therefore the current through $R_{fb}$ is identical to the current $I_{CL}$ coming out of the connection of the power supply unit for the communications line CL and can only find its way back to the power supply unit via $R_{sct1}$ or $R_{sct}$ and via the common ground line LED−. This current is measured by way of $R_{fb}$ and generates an internal measuring signal $V_{out}$ the value of which corresponds to the voltage $V_k$ increased by the measuring current $I_{CL}$ multiplied with the current measurement resistor $R_{fb}$. As $V_k$ is known, with $I_{CL}$ the value of $R_{sct1}$ and $R_{sct}$ is also known. This is therefore a (simple, proportionally inverting) control circuit RK1 as the interface reference voltage $V_k$ is not generated by the voltage source of the same name directly, but by the output of the control amplifier OpAmp. The output voltage $V_{out}$ representing the nominal value of the total current requirement thus results almost "along the way". This measuring signal $V_{out}$ serves as an input signal for the second control circuit RK2 which compensates dynamics and faults of the power component CG, and sets and controls the LED operating current $I_{out}$ to be supplied by the power component CG to the output of the power supply unit. The output of the power supply unit is connected to LED+ and the common ground line LED−, i.e. to the supply lines of the at least one light source module LEM.

The measuring error due to the voltage drop on LED− caused by the operating current of the at least one light source module, can be reduced by selecting an adequate value for $V_k$ to a value suitable for the application in question. In an example of a variant, the maximum measuring error on the ground line is set to 50 mV. This is the equivalent of a current of 1 A on a 50 mΩ connection. Setting the measuring error to this produces 5 V as the smallest value for the voltage $V_k$ so that $V_{out}$ has an error caused by the voltage drop of less than 1%.

In order to achieve better accuracy, other methods of compensating against the voltage drop on the common ground line may be used. One method is to switch off the operating current for the at least one light source module before measuring $R_{set}$. This measuring can be done by a delayed release of the operating current when switching on the overall system.

It should be noted that when switching off the chain of light source modules, by removing the power on the supply line LED+, the active current level on the communications line CL is not influenced by the temperature signal. This is not a disadvantage, because this information is not required if the light source modules are completely switched off, but it is a way to read the value of Rset not only with higher accuracy, but also without any deviation through possible overheating. The reading thus takes place without any deviation caused by the respective light source module temperature.

The pure temperature information is obtainable, however, by simply separating the reference voltage Vk from the non-inverting input of the operational amplifier OpAmp and through connecting this input to the common ground line. This causes the voltage on the communications line CL to become approximately zero and the current in CL is thus independent of the value of $R_{set}$. Consequently the current in CL is now only a function of the light source module temperature. In the case of multiple connections, i.e. several connected modules, the current is a function of the module with the highest temperature. This enables the power supply unit operating the light source modules to reduce the operating current to these modules right from the start and to determine the current operating temperature of the light source module, even if it is not overheated. For a high measuring accuracy of the temperature when the light source modules are in steady-state operation it is advantageous if $R_{set}$ is known.

In the also not yet published DE 10 2012 224 349.6, date of application also 21.12.2012, the applicant has also solved a further problem which has not yet been described here. In broad terms this involves processing the offset voltages or impedance adaptations constantly occurring during the processing of current information by way of an emitted voltage in the interior of a power supply unit. Particularly problematic is the output current measuring voltage $U_{mess}$ evident in FIG. 5 through which the reference mass is divided into a "higher half" and a "lower half". If, as is shown in FIG. 5, the lowest point of $V_k$ is connected to the "higher half", the first control circuit RK1 operates faultlessly for nominal value determination, but in order to control the LED operating current $I_{out}$ the second control circuit RK2 either has to be able to process negative actual value signals or has to cope with two reference potentials. If, on the other hand, and contrary to FIG. 5, $V_k$ is connected to the other side of $R_{mess}$, i.e. to the "lower half" of the reference mass, the reference potentials for both control circuits may be the same, but the nominal value formation is falsified by the measuring value $V_{mess}$ of the LED output current. As for reasons related to the principle both the problems do not arise in the solutions proposed here, detailed citations from DE 10 2012 224 349.6 can be dispensed with here.

FIG. 6 shows a temperature-dependent characteristic curve field of the power supply unit. The set of curves shows the internal control voltage $V_{out}$ of the power supply unit via the temperature of the at least one light source module. The individual curves are based on the current requirement of the currently connected at least one light source module. As can be clearly seen the thermal derating starts at a temperature of about 93° C., until at about 100° C. to 104° C., the supply of the operating current is switched off completely.

The function of the interface is explained below using a practical example. As can be seen in FIG. 6, an internal measuring signal $V_{out}$ of 10 V results in an output current of 1 A. The interface should be designed in a way that a conductance of 1 mS for Rset results in an output current of 1 A. According to FIG. 6 the voltage source Vk is set to 5 V. This means that 5 V are applied to Rset (see FIG. 5). The operational amplifier operates in a manner to minimize the level difference at its two inputs, which is made possible by its negative feedback via $R_{fb}$. Thus, when Vk is 5 V, this means that 5 V are also applied at the inverting input of the operational amplifier. This results in 5 V at the respective current setting resistor Rset and to a current through the communications line CL of $$\frac{5V}{1\,k\Omega} = 5\text{ mA}.$$

These 5 mA flowing through the communications line CL also flow through current measurement resistor $R_{fb}$, as the input of the operational amplifier has a high impedance and therefore a negligible current consumption. As the voltage of the internal measuring signal $V_{out}$ in accordance with FIG. 6 for the desired operating current should be 10 V, the voltage across the current measurement resistor $R_{fb}$ must also be 5 V, resulting in a resistance value of 1 kΩ respectively 1 mS for $R_{fb}$. According to this example, a light source module with a current requirement of 2 A would have a current setting resistor Rset of 2 mS or 500Ω.

As already mentioned, the three-line interface has the disadvantage that the measuring signal is falsified by the voltage drop on the common ground line LED− caused by the operating current of the at least one light source module. After all, the measurement current passes through the common ground line LED− along with the LED operating current.

FIG. 7 shows the characteristic curve of the current measuring unit CMU, which is mainly dependent on the current measurement resistor $R_{fb}$. The characteristic curve shows the internal signal $V_{out}$ of the output of the current measuring unit CMU against the normalized current measurement resistor $$\frac{Rfb}{RsetMin}.$$

$R_{sctmin}$ is the minimum allowable value of the at least one current setting resistor, which leads to the maximum specified output current $I_{outmax}$ of the power supply unit PSU. Thus, with the shown value of 1, if $R_{fb}=R_{sctmin}$, the power supply unit delivers its maximum current at a given voltage of the at least one light source module, thus also its maximum power at its output. The internal measuring signal $V_{out}$ belonging to the maximum power is 2*Vk, as described in the example for FIG. 6.

SUMMARY

On the basis of the circuit configuration shown in FIG. 5, the object of the present disclosure consists in providing a light source module, a power supply unit for operating such a light source module as well as a lighting system with a power supply unit of this kind and at least one light source module of this kind which is characterized by an improved degree of efficiency.

The present disclosure is based on the knowledge that in the circuit configuration of FIG. 5 losses occur both on the current setting resistor Rset, which as stated above is formed by a current setting resistor Rset1, or through the parallel connection of several current setting resistors Rset1, Rset2, Rsetm. In addition, losses occur on the current measurement resistor $R_{mess}$. In the dimensioning example given above a power loss of 0.5 W occurs on the measurement resistor $R_{mess}$ for example.

The present disclosure is now based on the idea of using voltage information on the communications line CL instead of current information, both as a measure of the total current requirement as well as a feedback parameter for controlling the actual current $I_{out}$ of the power supply unit PSU. This is made possible in that instead of a current setting resistor, at least one current measurement resistor is provided which, forming a coupling point, is connected in series between the at least one LED cascade and the reference potential, wherein the conductance of the current measurement resistor is proportional to the current requirement of the LED cascade. Additionally, at least one coupling resistor is provided which is connected between the coupling point and the communications line.

In this way, two series-connected current measurement resistors—in FIG. 5 these are the resistors Rset and $R_{mess}$—are avoided. Instead, double use is made of the current measurement resistors now arranged in the light source module. In this way the losses in the no longer present second current measurement resistor are avoided, which results in an improvement in efficiency.

Additionally, through this measure a reintroduction of a type of natural and light source module-specific current division can be achieved, more particularly an uneven current division among the individual light source modules that are connected to a single power supply unit.

The following example can illustrate this: imagining that in a light source module three LED cascades are connected in parallel to create an RGB module, it must be taken into account that the LEDs emitting green light have to be operated with a higher current than the LEDs emitting red and blue light. Due to the higher current flowing through the LEDs that emit green light the temperature in the branch including the green LEDs increases. As a result of the temperature-dependency of the diode characteristic its voltage decreases so that the current flowing through the LEDs emitting green light increases further. The branch including the LEDs emitting green light therefore takes over current portions of the branches connected in parallel. The originally envisaged current division is thereby no longer assured, i.e. the branches containing LEDs emitting red and blue light become darker. As, according to the present disclosure, the current measurement resistors have moved into the light source module, for each of the LED cascades connected in parallel in the example, an individual current measurement resistor can be provided in order to set and measure the current of the relevant cascade. Due to the initially explained relationship, the measurement resistor of the branch containing LEDs emitting green light must have the lowest ohmic value. Generally speaking the dimensioning must be selected such that the forward voltages of all LED cascades or branches to be connected in parallel are in themselves identical to each other at their nominal current and at an even operating temperature determined for a steady state, and that the voltage drops at the associated measurement resistors at the relevant nominal currents are also identical to each other, in particular preferably at a value of 1 V. If, due to the temperature, the current in one of the LED cascades or LED branches connected in parallel increases, the voltage drop at the associated measurement resistor also increases. As the measurement resistor is present in the first place, the total supply voltage for the light source module remains approximately constant, the adjacent LED branches hardly become darker. Inversely, the measurement resistors also connected in series to the adjacent LED branches bring about a type of "cushioning" of the small fall in the total supply voltage during a temperature-related current increase in a branch, so that the adjoining branches become even less dark. Darkening or an unnatural current division is thereby reliably prevented. In other words, as the current measurement resistors have moved into the relevant light source modules, a symmetry effect occurs, through which the drawbacks arising in the prior art can be avoided. If temperature-related symmetrizing is present, the voltage drop is, as explained above, no longer of exactly the same magnitude at each of the involved measurement resistors. Here the coupling resistors come into play: in order to balance out such small differences between the voltages falling over the individual current measurement resistors RMx and to measure a mean value of all voltages as feedback for the current regulation of the power supply unit PSU the individual nodes between the measurement resistors and the associated LED cascades are not hard-connected to the communications line CL, but are connected to this line by means of medium-ohmic coupling resistors RCx. Otherwise high equalizing currents could occur between the light source modules LEM which overload the communications line CL and falsify the entire measurement. What has been shown in the example for LED cascades connected in parallel within a light source module applies accordingly for light source modules connected in parallel. According to the present disclosure these advantages are achieved in that the first control circuit RK1 which is known from the prior art for determining an LED nominal operating current value is dispensed with, and in that the control loop of the second control circuit RK2 from the prior art, which is now the only effective control circuit, is closed by the light source modules ("loop close interface").

As a result, the present disclosure allows the operation of different LED cascades with different nominal currents on one and the same power supply unit. This is simply possible in that the conductance of the corresponding current measurement resistor is adapted. In comparison to the other LED cascades, a lower ohmic current measurement resistor is therefore connected in series to an LED cascade with a high current requirement and vice versa.

A further advantage of the present disclosure consists in the fact that unavoidable losses are spread. In the prior art, as a result of the losses at measurement resistor $R_{mess}$ a hotspot occurs. This can lead to a premature aging of components arranged in the vicinity and also affects the operation of components with temperature-dependent current and voltage characteristics, for example the light diodes of interest here.

In this respect a preferred form of embodiment of a light source module according to the present disclosure includes several LED cascades connected in parallel, wherein each LED cascade is assigned a current measurement resistor and a coupling resistor. In this way RGB modules can be created in which there is no danger of, for example, the LED cascades emitting red and blue light becoming darker in regard to the LED cascade emitting green light during operation.

The conductance of the at least one coupling resistor is set to be proportional to the current requirement of the relevant LED cascade.

It can, however, also be envisaged that the value of the at least one coupling resistor is set to be identical for each LED cascade.

In the event of locally detected overheating, the thermal derating unit TDU already known from the prior art and taken over herein emits its output current $I_{TDU}$ directly to the communications line, i.e. to the connection of all coupling resistors to the connector of the power supply unit for the communications line CL and not in each case to the nodes between the affected LED cascade and associated measurement resistor. As a result, considerably lower currents suffice for being able to adequately increase the voltage on the communications line CL for an effective LED operating current reduction as the parallel connection of all coupling resistors is designed to be more highly resistant than an individual measurement resistor.

A power supply unit according to the present disclosure for operating at least one light source module of this kind is characterized in that the power supply unit includes one output with a first and a second output connector, wherein the first output connector is coupled to the supply line of the at least one light source module, wherein the second output connector is coupled to the ground line of the at least one light source module. It also has a communications connector which is coupled to the communications line of the at least one light source module, as well as an adjustable current source, which on the output side is coupled to the first and the second output connector in order to provide an output current, wherein on the input side the current source has a control connector.

A regulating switch is envisaged which on the input side is coupled to the communications connector and on the output side to the control connector of the current source, wherein the regulating switch includes a control circuit which is designed, as a function of the voltage signal on the communications connector, more particularly through the dynamics that arise in the closed control loop, to determine a nominal value of the current to be provided by the current source, and through the voltage level on the communications line to regulate the actual value of the current provided by the current source in dependence on said nominal value, wherein the control circuit has a negative feedback designed in such a way that the control circuit does not influence the direct voltage value of the signal on the communications line.

Preferably the regulating switch includes a second voltage source as well as a first operational amplifier, wherein the second voltage source is coupled between the non-inverting connector of the first operational amplifier and the second output connector, wherein the inverting connector of the first operational amplifier is coupled to the communications connector. The negative feedback circuit of the first operational amplifier is preferably highly resistant to direct currents so that the measurement of the voltage signal on the communications connector cannot be falsified.

Preferably coupled between the output and the inverting input of the first operational amplifier is the series connection of an ohmic resistor and a capacitor. This makes it possible to evaluate a voltage signal on the communications line, on the one hand for determining the current requirement, which is reflected in the nominal value of the output current $I_{out}$ and on the other hand for regulating the actual value of the output current Iout.

The regulating switch preferably includes a current source which is coupled to the inverting input of the first operational amplifier. This ensures a fail-safe behavior of the power supply unit if no light source module is connected to the output connectors of the power supply unit.

In connection with this the current source of the regulating switch is preferably formed by a third voltage source, which via an ohmic resistor is coupled to the inverting input of the first operational amplifier.

It has also proven to be advantageous if the current source of the regulating switch is designed in such a way that its output current is linearly proportional to the voltage at the output of the first operational amplifier, wherein, in particular, the following applies:

$$I_{CL} = Iout \frac{RMx}{RCx},$$

where $I_{CL}$ is the current at the output of the current source of the regulating switch, $I_{out}$ the output current of the adjustable current source of the power supply unit, $R_{MX}$ the current measurement resistor of the light source module x and $R_{Cx}$ the coupling resistor of the light source module x.

Through this measure the voltage information on the communications line can be increased from a value of the order of 1 V to considerably higher values, for example to 2.5 V or even 3 V or 5 V in order to improve the accuracy and resolution. In this way better, i.e. load- and thermostable reference voltage sources can be used for the second voltage source and the errors due to the drop in the direct voltage on the common ground line become negligible.

In a particularly preferred form of embodiment the current source of the regulating switch includes a second operational amplifier, a first, a second, a third, a fourth and a fifth ohmic resistor as well as a fourth voltage source, wherein the first ohmic resistor is coupled between the output of the first operational amplifier and the non-inverting input of the second operational amplifier, wherein the second ohmic resistor is coupled between the output of the second operational amplifier and the inverting input of the first operational amplifier, wherein the third ohmic resistor is coupled between the non-inverting input of the second operational amplifier and the inverting input of the first operational amplifier, wherein the fourth ohmic resistor is coupled between the output of the second operational amplifier and the inverting input thereof, wherein the fifth ohmic resistor is coupled between the fourth voltage source and the inverting connector of the second operational amplifier. The second connector of the fourth voltage source can preferably be connected to the common ground line of the power supply unit, or particularly preferably to the positive input of the second voltage source. In this way an analog adjustable voltage-to-current amplifier is created.

Preferably a capacitor is connected in parallel to the fourth ohmic resistor, through which dead times within the current source providing the current $I_{out}$ can be compensated. The current source of the regulating switch thus exhibits a slight PT1 behavior, i.e. a first order low pass behavior.

Particularly preferably the values of the first, the third and the fourth ohmic resistor are equal. In this way the working range in which the second operational amplifier does not overload is maximized.

It is also preferred if the conductance of the second ohmic resistor is equivalent to total conductance of all coupling resistors connected in parallel. This optimizes the linearity of the overall arrangement over a broad working range, in addition to further very advantageous dimensioning, namely in that the above three equally large resistors are selected to be considerably more resistant, more particularly ten to one hundred times more resistant than the second ohmic resistor. Through this, in relation to the effect the second operational amplifier becomes "OpAmp" in FIG. 5, the second resistor acquires the same value and the same function as "$R_{fb}$" in FIG. 5.

According to a preferred form of embodiment the fifth ohmic resistor is selected as follows:

$$Radj = \frac{Rcs^2}{Rcc + Rcs}$$

where Radj denotes the fifth ohmic resistor, Rcs the third ohmic resistor and Rcc the second ohmic resistor.

In order to permit dimming, the second voltage source can be modulated. In particular it is connected to a corresponding modulation device, which in turn has an interface for supplying dimming information.

In connection with this the power supply unit can furthermore include a low pass filter which is coupled between the second voltage source and the non-inverting input of the first operational amplifier. This low pass filter acts as a gradient limiter and thereby benefits the initial switching on of the power supply unit in such a way that overshoots are prevented.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 8:
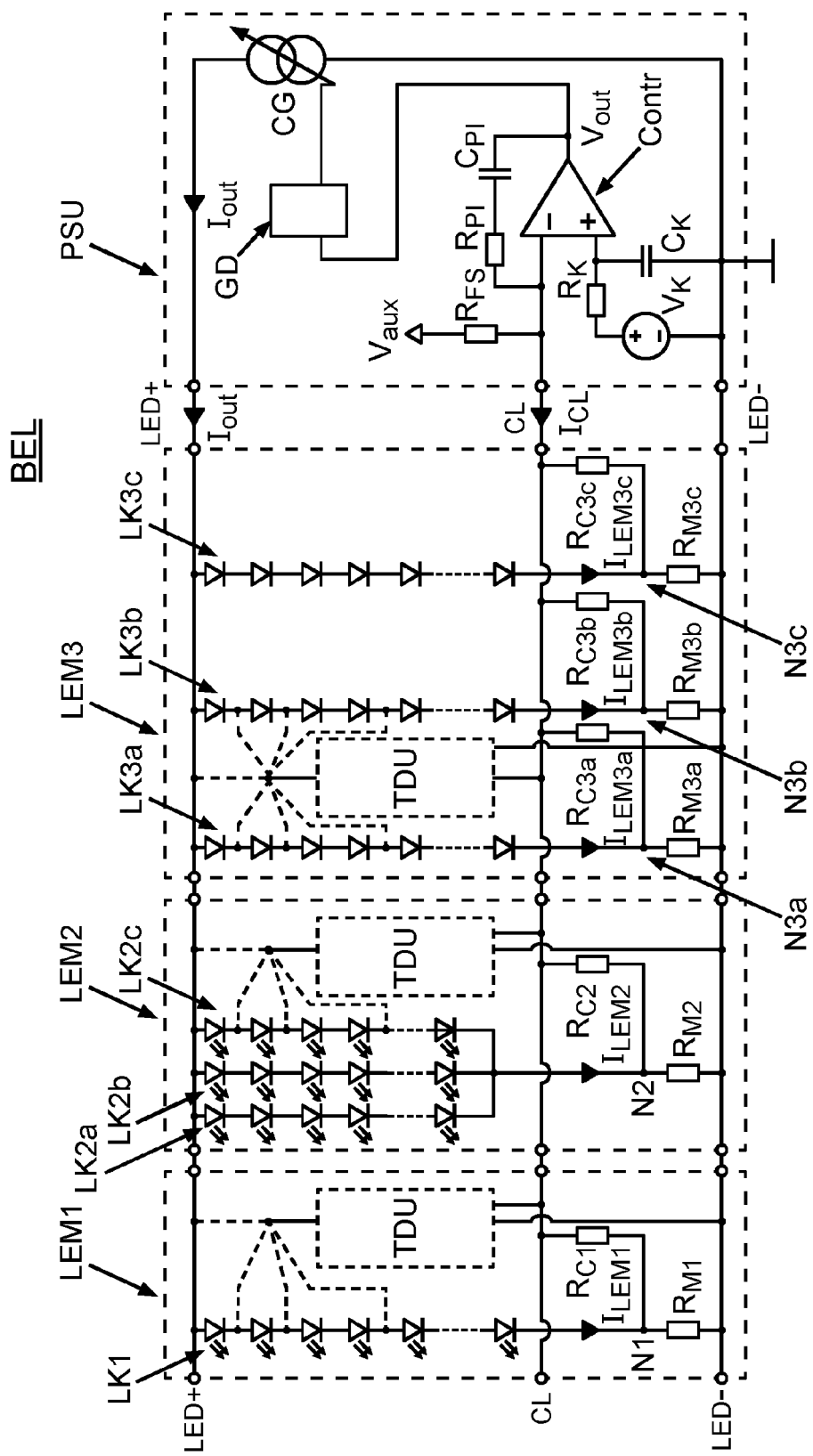
FIG. 8 shows a schematic view of a block circuit diagram of a lighting system according to the present disclosure with three light source modules according to the present disclosure and a power supply unit according to the present disclosure.

FIG. 8 shows a schematic view of an example of embodiment of a lighting system BEL according to the invention which includes a power source unit PSU according to the present disclosure as well as, for example, three light source modules LEM1, LEM2 and LEM3. Whereas in the case of light source module LEM1 only one LED cascade LK1 is present, the light source module LEM2 includes three LED cascades LK2a, LK2b and LK2c which are connected in parallel. The light source module LEM3 also contains three LED cascades LK3a, LK3b and LK3c which, however, are not connected directly in parallel as will be explained in more detail below.

As can also be seen from FIG. 8, forming a coupling point N1, N2 or N3a, N3b and N3c a current measurement resistor RMx is connected in series between each LED cascade or group of parallel-connected LED cascades and the reference potential, wherein the conductance of the current measurement resistor is proportional to the current requirement of the relevant LED cascade or group of LED cascades. If ILEMx is the operating current of the relevant LED cascade or group of LED cascades in the nominal operating point, the measurement resistors RMx are preferably dimensioned in such a way that at the nominal operating point there is a voltage drop of, for example, 1 V on them. This relationship can be expressed more generally as:

$$\frac{1V}{RMx} = ILEMx$$

In order to even out small deviations between the voltages decreasing over the individual current measurement resistors RMx and to measure a mean value of all the voltages as feedback for the current regulation of the power supply unit PSU, the individual nodes between them and the associated LED cascades are not hard-connected to this line CL, but are connected to this line by means of medium-resistance coupling resistors RCx.

Otherwise high equalizing currents could occur between the light source modules LEM which overload the communications line CL and falsify the entire measurement. As shown in FIG. 8 different types of light source modules LEM according to the present disclosure, including different nominal current values can be connected to one and the same power supply unit PSU at the same time as long as each light source module LEM forming part of the entire lighting system BEL, connected to the one power supply unit PSU and supplied by it with the required energy has the same nominal operating voltage.

Figure 1:
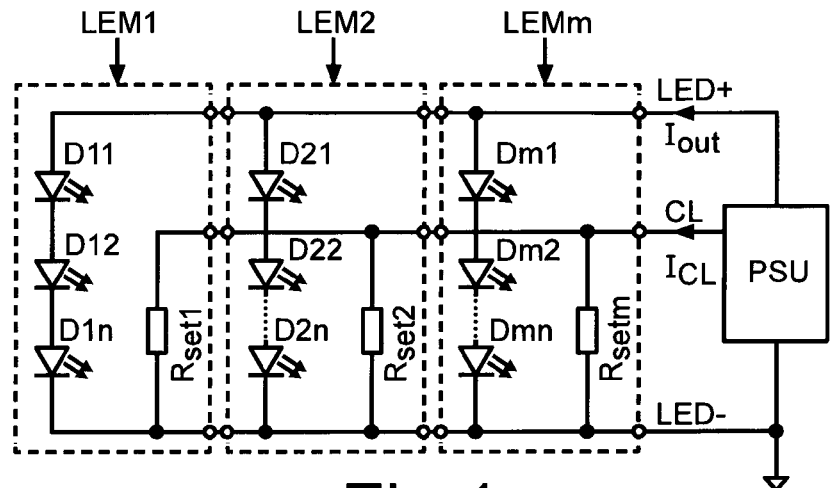
FIG. 1 shows a schematic view of the concept of the parallel connection of the current setting resistors.
Figure 2:
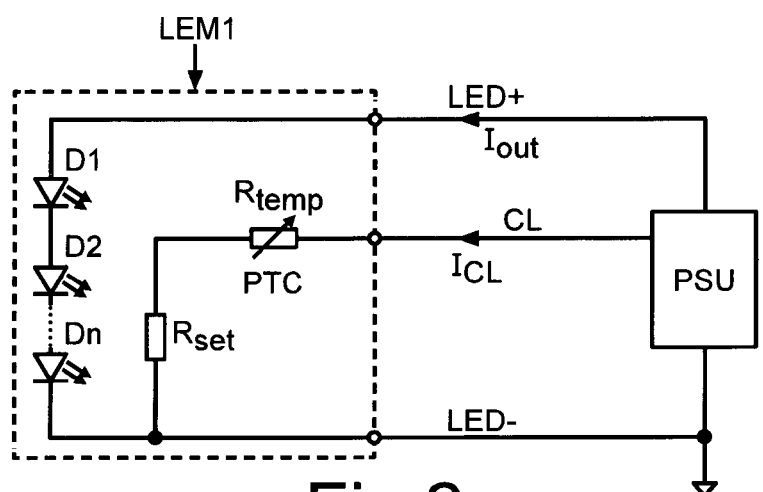
FIG. 2 shows a schematic view of a very simple solution for thermal derating.
Figure 3:
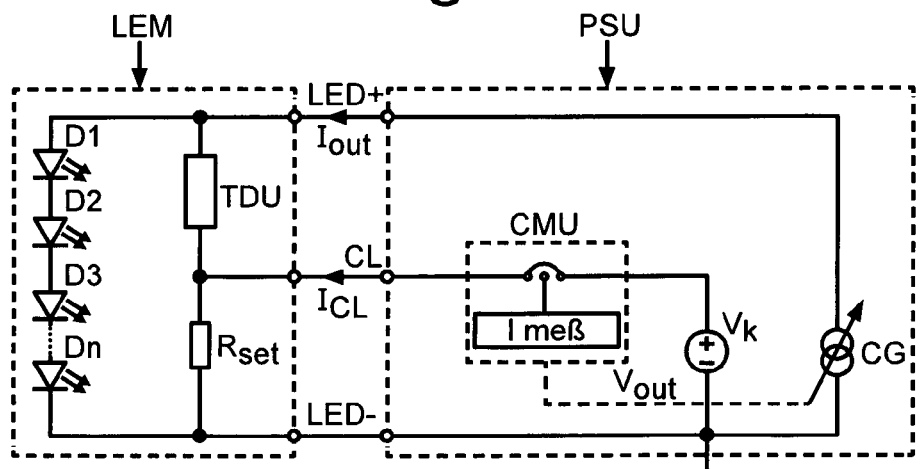
FIG. 3 shows a schematic view of the entire concept with the thermal derating unit TDU.
Figure 4A:
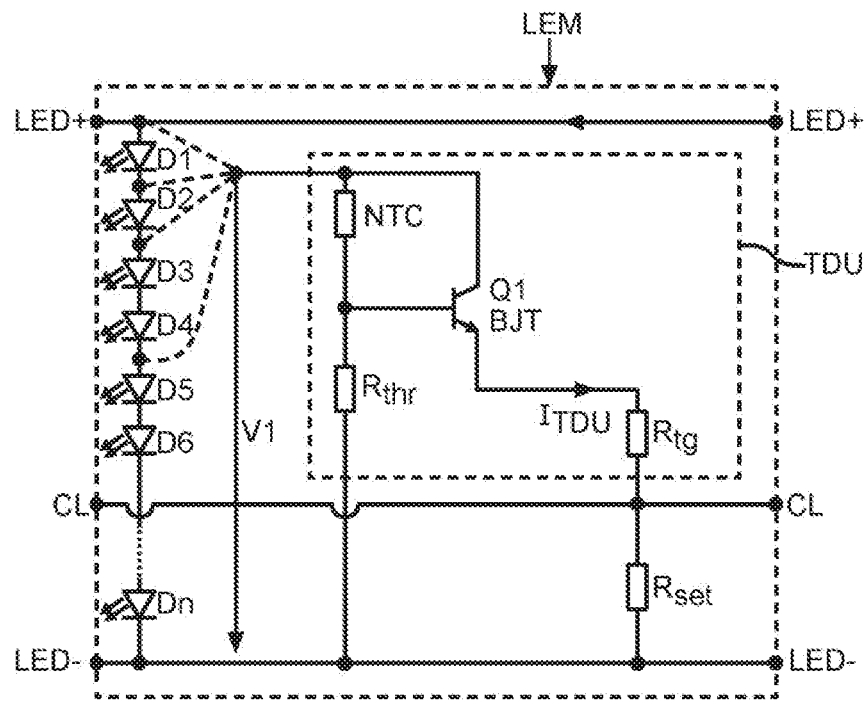
FIGS. 4A and 4B show schematic views of two simple variants for creating the temperature derating unit TDU.
Figure 4B:
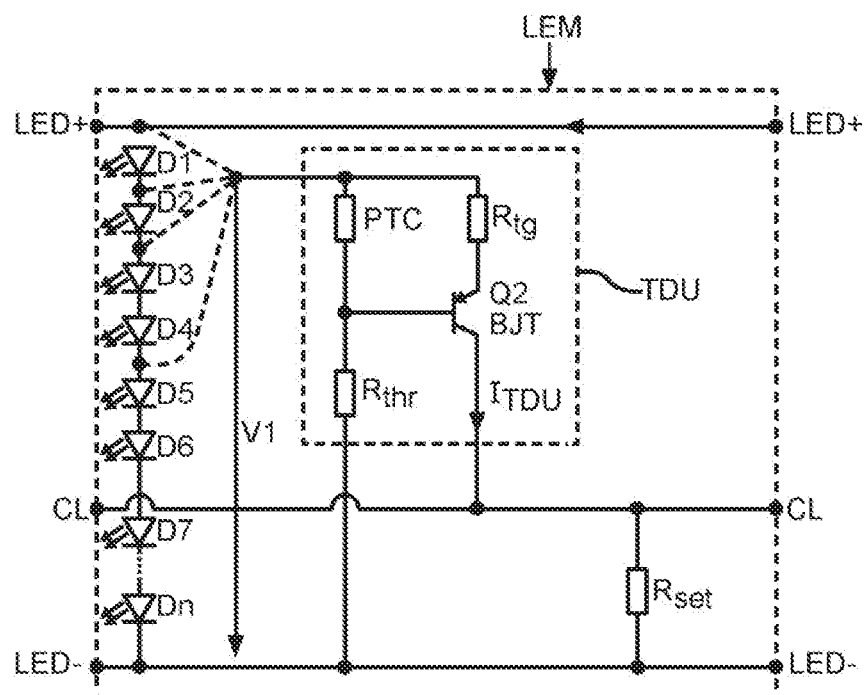
Figure 5:
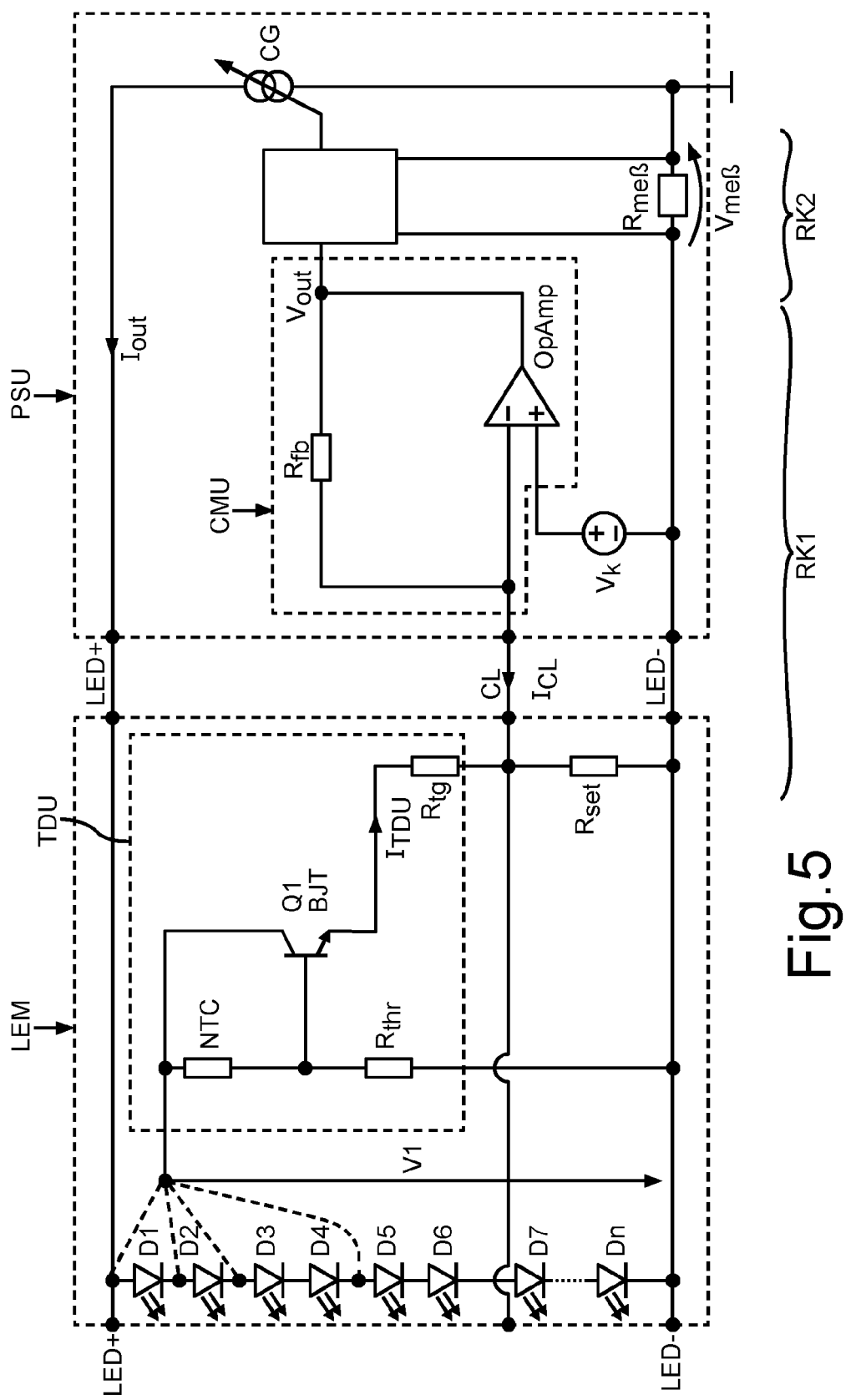
FIG. 5 shows a schematic view of the interface on the power supply unit side, wherein Vout is an internal device voltage brought about through the current in the communications line CL and serves as the nominal value for the second control circuit RK2.

As is shown by a comparison of FIG. 8 with FIG. 5, in the present disclosure the power supply unit PSU is missing the otherwise usual current measurement resistor $R_{mess}$ in the common ground line LED−. Ultimately, through this two current measurement resistors connected in series are avoided, cf. FIG. 5.

The communications line CL is directly connected to the inverting input of the proportionally-integrating compensated control amplifier Contr. This control amplifier has a negative feedback including the resistor $R_{PI}$ and the capacitor $C_{PI}$ connected in series thereto. The non-inverting input of the operational amplifier is connected to a gradient-limiting low pass filter which is charged to a reference voltage $V_k$ and includes a resistor $R_k$ and a capacitor $C_k$. The output of the control amplifier at which the control variable $V_{out}$ applies is connected to the input of a gate control circuit GD.

From the operational amplifier rule "equalization of the input voltages" it follows for this topology that under normal operating conditions the voltage on the communications line CL, measured against the common ground line LED−, corresponds to the reference voltage $V_k$. As the gate control circuit GD emits time-controlled signals to the adjustable current source CG, the power unit of the power supply unit PSU starts with the gate control circuit GD.

Preferably the gate control circuit GD includes a PWM generator or an adjustable frequency generator or both, some small amplifiers and, if necessary, pulse transformers or bootstrap circuits for controlling the power switches with step potential. For the sake of clarity these are not shown, but they are definitively known to the person skilled in the art.

Dynamically, and seen as a unit, the gate control circuit GD and the current source CG form a system exhibiting an essentially linear relationship between the control variable $V_{out}$ and the output current $I_{out}$, i.e. there is an almost constant amplification factor between these two parameters. Between $V_{out}$ and $I_{out}$ there may be an offset, a certain maximum ramp gradient of the output current $I_{out}$, a coherent characteristic time constant and possibly a relatively small dead time, depending on the internal switching frequency of the gate control circuit GD. Said offset is automatically compensated by wiring the control amplifier Contr as a PI controller, as due to the direct current-blocking capacitor $C_{PI}$ the control variable $V_{out}$ can at its output take on any static value required for stable operation of the power supply unit PSU. For this reason $V_{out}$ can be connected directly to the input of the gate control circuit GD.

The circuit configuration shown in FIG. 8 is based on the double use of voltage information on the communications line CL, on the one hand as total current requirement feedback and on the other hand directly as feedback voltage for regulating the output current of the power supply unit PSU, in other words, once for providing a nominal value for the output current $I_{out}$ on the basis of the total current requirement feedback and also for regulating the actual value of the current $I_{out}$.

This is made possible in that the total current measurement resistance $R_{mess}$, concentrated in the power supply unit in accordance with FIG. 5, on all the light source modules LEM simultaneously connected to the one power supply unit PSU in question, is divided into the individual current measurement resistors $R_{MX}$ or into $R_{M1}$, $R_{M2}$, $R_{M3a}$, $R_{M3b}$ and $R_{M3c}$ in accordance with FIG. 8. The power supply unit PSU in FIG. 8 therefore does not have a current measurement resistor in its power output current path, i.e. in the current path of its adjustable current source CG.

For each light source module or for each LED chain the respective ohmic coupling resistor $R_{Cx}$ can be dimensioned identically, for example $R_{Cx}=1$ k$\Omega$ or $R_{Cx}=10$ k$\Omega$. As, due to the direct connection of the PI controller Contr to is direct current-blocking negative feedback no direct current flows through these coupling resistors, standard dimensioning of the coupling resistors $R_{Cx}$ irrespective of the nominal currents $I_{LEMx}$ is possible. But this also produces the following problem: as the control amplification of the power supply unit current controller Contr is defined by the ratio of the negative feedback resistor $R_{PI}$ to the parallel connection of all simultaneously connected $R_{Cx}$, the dynamic behavior of the closed current control loop becomes dependent on the number of connected LED chains or light source modules.

This problem is solved in that the values of the coupling resistors RCx are made dependent on the light source module nominal current in a similar manner to the values of the current measurement resistors RMx above:

$$\frac{1V}{RCx} = \frac{ILEMx}{20...1000}$$

In this way the aforementioned dynamic behavior of the closed current control loop, defined by the current control circuit of the power supply unit according to the present disclosure per se, and all measurement resistors $R_{Mx}$ and coupling resistors $R_{Cx}$ connected thereto, is no longer dependent on the number of simultaneously connected light source modules, but now only on the total current requirement. The aforementioned double use takes place in that recording of the actual value of the LED operating current occurs through the voltage on the communications line itself, and the total current requirement feedback in contrast through the current dynamics of the closed current regulating loop resulting from the overall system: the greater the total current requirement, the greater the regulating amplification of the power supply unit current controller Contr.

In order to make a system of a power supply unit PSU and at least one light source module LEM intrinsically fail-safe against a lacking connection with the communications line CL or against ineffective resistors $R_{MX}$ or $R_{Cx}$, or to make a power supply unit PSU safe against idling, on the power supply unit side the communications line connector is increased slightly via a high-ohm fail-safe resistor Rfs, which is connected to the internal auxiliary voltage supply Vaux of the power supply unit PSU. The value of the fail-safe resistor Rfs can be in the range of several megaohms. It supplies a very small current $I_{CL}$ which comes from the CL connector of the power supply unit PSU.

As described above, the voltage at the communications line CL connection of the power supply unit PSU is generally equal to the voltage $V_k$. On the module side the voltage between the communications line CL and the common ground line LED– is preferably 1 V, determined by the respective dimensioning of the current measurement resistors $R_{Mx}$.

This results in a value of 1 V for the reference voltage $V_k$ in the case of the above dimensioning of this simplest form of embodiment of the present disclosure according to FIG. 8.

Figure 9:
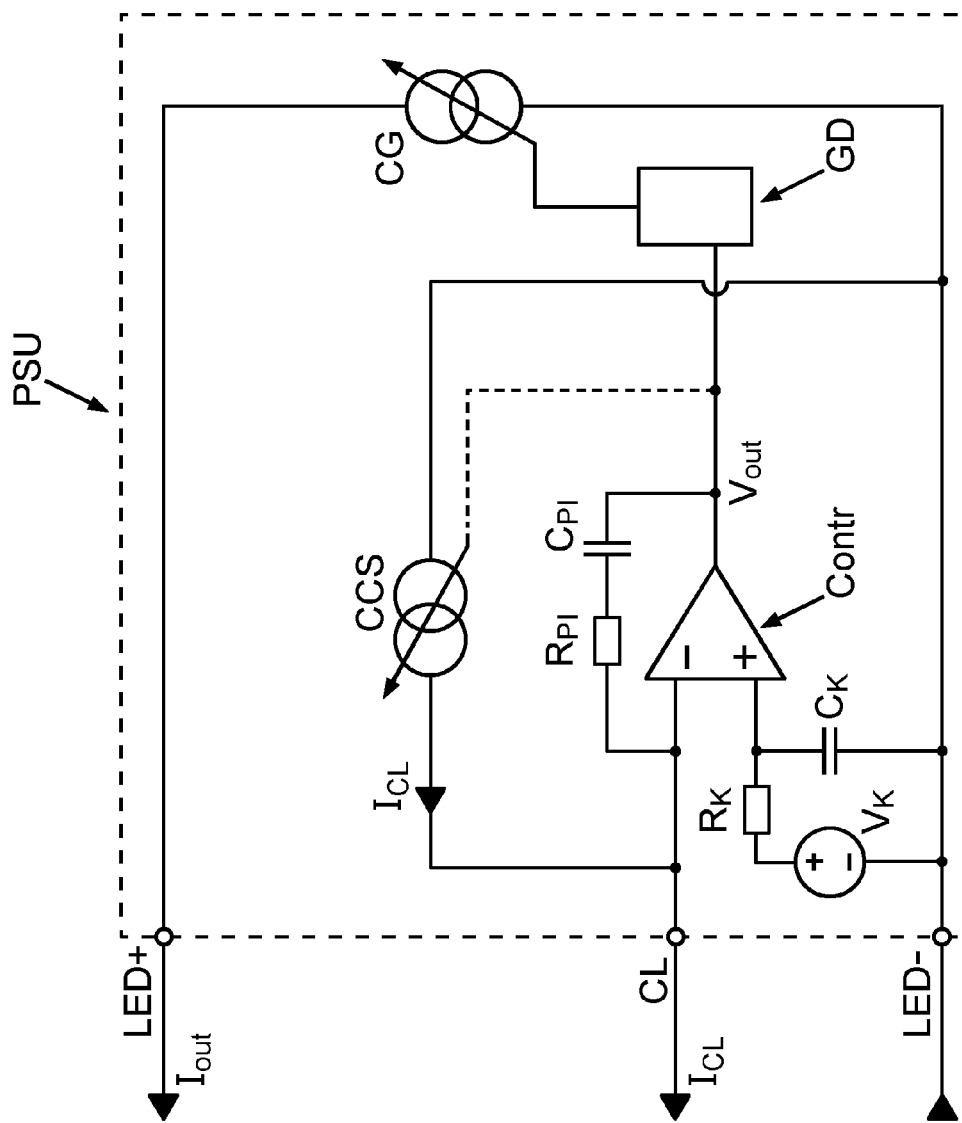
FIG. 9 shows a schematic view of a second example of embodiment of a power supply unit according to the present disclosure.

As the coupling resistors $R_{Cx}$ are made dependent on the nominal current of the light source module or LED chains, the embodiment of the present disclosure shown in FIG. 9 becomes possible. Through higher-ohm coupling resistors dimensioned as follows for example:

$$\frac{1V}{RCx} = \frac{ILEMx}{100...5000}$$

the feedback voltage on the communications line CL can be increased to considerably higher values, for example to 2.5 V or even 3 V or 5 V. In the case of 2.5 V or 5.0 V the reference voltage $V_k$ for example of a component TL431, which has a very stable inner reference voltage source, can be produced. Better accuracy and resolution are achieved through this. A particularly welcome consequence is that the errors due to the direct voltage drop on the common ground line LED– can be made negligible.

In order to be able to also set these higher voltage values in the case of initially unknown values of the coupling resistors connected to the communications line, the above current source formed by the fail-safe resistor $R_{fs}$ at the auxiliary voltage source $V_{aux}$ must be replaced with a more complex source which is designated below as a conditioning current source CCS and shown in more detail in FIGS. 9 to 10B.

As shown schematically in FIG. 9, its output current $I_{CL}$ is linearly proportional to the output voltage $V_{out}$ of the PI controller Contr and has a value inversely related to the output current $I_{out}$ with regard to that of the resistors $R_{Mx}$ and $R_{Cx}$ of the LED chains or light source modules. Typically the current $I_{CL}$ of the source CCS is between 1% and 1% of $I_{out}$.

Figure 10A:
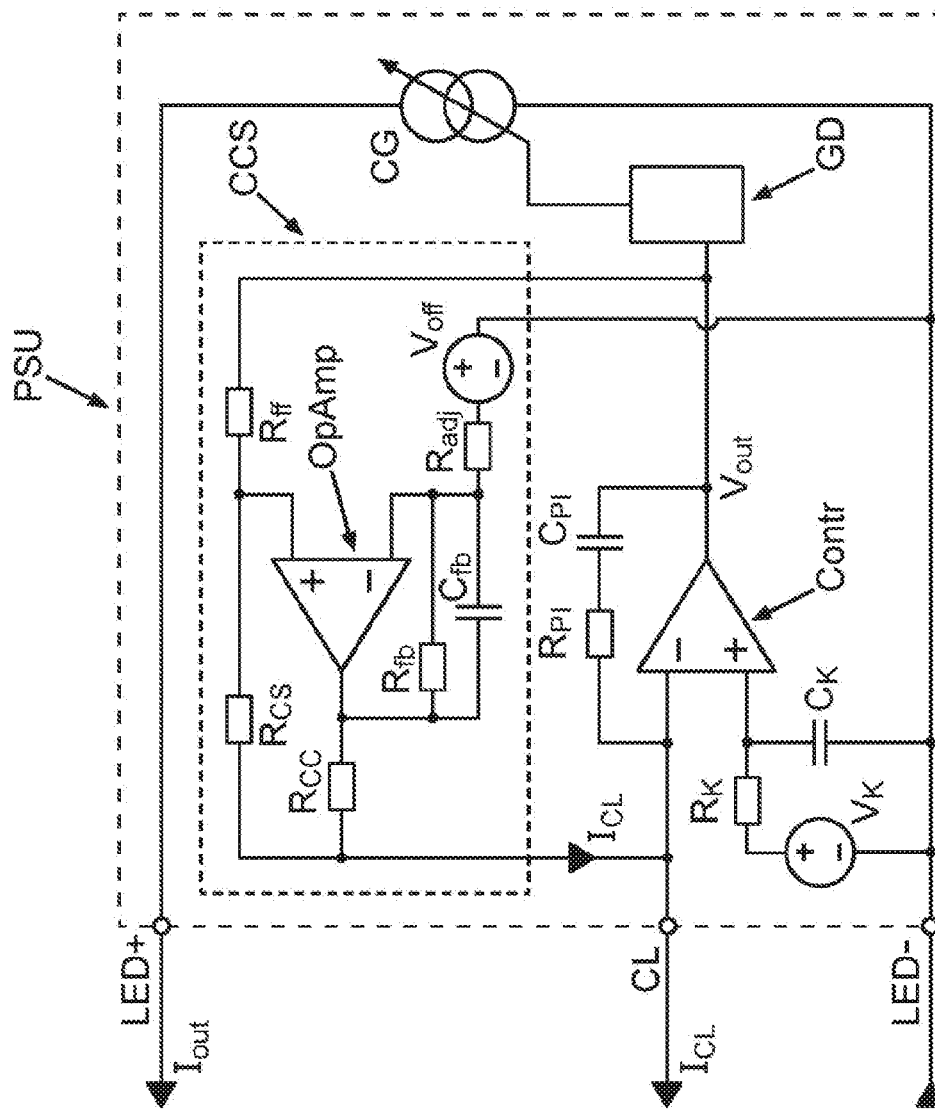
FIGS. 10A and 10B show schematic views of a third example of embodiment of a power supply unit according to the present disclosure for 100% operation (FIG. 10a) and for dimming operation as proposed here (FIG. 10b)
Figure 10B:
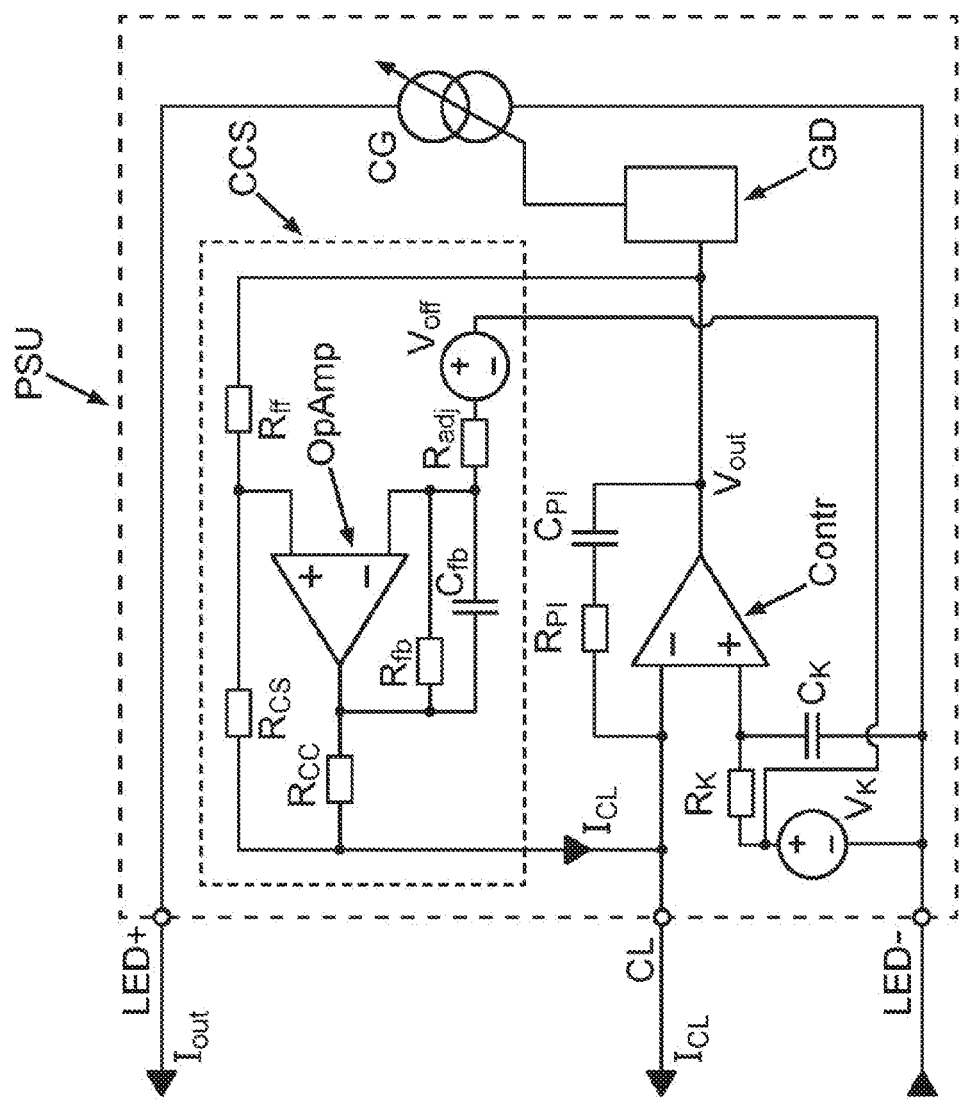

Preferably the conditioning current source CCS can, as shown in FIGS. 10A and 10B, be formed as a voltage-controlled current source and preferably includes an operational amplifier OpAmp surrounded by five resistors: the normal linear subtractor, which has a resistor between the non-inverting input of the amplifier and its reference mass, can be transformed into an analog voltage-to-current amplifier in that an output series resistor, the so-called conditioning resistor Rcc, is added and, instead of to the reference mass, the aforementioned resistor at the non-inverting input is connected to the free end of the conditioning resistor Rcc. The latter accordingly forms a current source terminating resistor and is referred to as Rcs in the illustration of FIGS. 10A and 10B. In this way the output current $I_{CL}$ of the amplifier OpAmp is measured and this measurement is automatically fed back for voltage difference formation.

Preferably it is ensured by means of a negative feedback resistor $R_{fb}$ that the negative feedback is stronger than any positive feedback.

A coupling resistor $R_{ff}$ brings the voltage $V_{out}$ into the circuit, wherein with an adjusting resistor $R_{adj}$ the feedback is finally completed. As its name suggests, the adjusting resistor plays an important part in the setting of the circuit for the conditioning current source CCS in that its output current at the node between $R_{Cs}$ and $R_{CC}$ becomes totally independent of the current output voltage at the same node.

In the literature the adjusting resistor is connected at its other side to the reference mass of the entire circuit (not shown). In FIG. 10A it is connected to the fourth voltage source or offset voltage Voff, the negative pole of which is on the common ground line LED−; in FIG. 10B between the other side of the adjusting resistor and LED− the second and the fourth voltage source are arranged in series in such a way that their values add up positively.

Preferably the values selected for $R_{fp}$, $R_{Cs}$ and $R_{fb}$ are identical. The value of $R_{CC}$ should lie in the range of the smallest anticipated resistance value of all coupling resistors $R_{Cx}$ connected in parallel or correspond to it precisely, and the value for the other three resistors $R_{fp}$, $R_{CS}$ and $R_{fb}$ selected to be accordingly ten to one hundred times higher. If $R_{adj}$ corresponds to the equation $$Radj = \frac{Rcs^2}{Rcc + Rcs}$$

the conditioning current source CCS produces its output current $I_{CL}$ completely independently of the voltage currently present at the connection of the communications line CL (current source definition), and its conversion rate under the desired influence of offset voltage $V_{off}$ is given by $$I_{CL} = \frac{(Rcc + Rcs)(Vout - Voff)}{Rcc \cdot Rcs}$$

Accordingly $I_{CL}$ is equal to the input voltage difference divided by the parallel connection of conditioning resistor Rcc and current source terminating resistor Rcs.

The conditioning current source CCS has thus become a model of the power unit of the power supply unit PSU including the adjustable power current source CG and the upstream gate control circuit GD. The output voltage $V_{out}$ of the control circuit is emitted as a control variable in parallel and equally to the power unit and as a control variable to the voltage-controlled conditioning current source CCS. The power unit reacts to the input of $V_{out}$ with the production of $I_{out}$, the conditioning current source with the output of $I_{CL}$. At the measurement resistors $R_{Mx}$ of all the connected light source modules $I_{out}$ causes a voltage drop which as a measure of the actual value of the LED operating current is fed back via the communications line CL to the control circuit. For reasons of light source module efficiency this measure is very low, typically around 1 V, often too low for rational further processing in the control circuit as explained above. Otherwise, i.e. rarely, feedback of this measure into the control circuit is sufficient for fully solving the set task: the power supply unit PSU does not recognize the total current requirement in detail, only whether $I_{out}$ is correct or not; that the absolute LED total operating current and in a first approximation even the operating currents in the individual LED lines are correct is managed by the current measurement resistors $R_{Mx}$ by themselves as a result of the above dimensioning; the globally seen parallel connection of the current measurement resistors also deals with the required summation for the total current requirement. Partial loading hereby emerges by itself and correctly, overloading is detected and intercepted by the power supply unit. The total current requirement can be derived by the power supply unit by way of the dynamics of the currently closed control circuit.

In the more frequent cases on the other hand $I_{CL}$ generates a further voltage at the coupling resistors $R_{Cx}$ which is added at the nodes N1, N2, N3$a$, N3$b$, N3$c$ to the measure for the LED operating current. In this way the voltage signal for the feedback to the control circuit based on the measure for the actual value of the LED operating current is increased by said further voltage. Purely quantitatively this facilitates, as desired, evaluability by the control circuit. However, the intrinsic total current requirement feedback described above for a rare case is lost through precisely this being made superfluous.

The value of this further voltage is the product of the conditioning current source output current $I_{CL}$ with the resistance value of the parallel connection of all currently connected coupling resistors $R_{Cx}$. If their values are all equal and known, and if the number of connected LEMs is known, the real measure of the actual value can be concluded from this. However, not only is this number not known but due to the possibly different LED nominal operating currents it is even of no importance. For this reason the improved example of embodiment was introduced in which the conductance of these coupling resistors too is selected to be proportional to the nominal operating current of the associated LEMs. Thus, at least on the module side the intrinsic behavior of the total current requirement feedback is restored again: if the voltage on CL is correct, the LED total operating current $I_{out}$ is correct, irrespective of how high it is in absolute terms. Without an increase in the voltage level on CL through a conditioning current source the voltage drop at the measurement resistors even with the proportionally dimensioned coupling resistors can, as in the above rare cases, be directly returned to the control circuit as a measure of the actual value of the LED operating current.

However with the increase the difficulty arises that only a fraction, typically 10% to 40% of the voltage level on CL originates directly from the operating current measurement: on the power supply unit/control circuit side the intrinsicity is not restored again, unless the level increase by the further voltage is approximately proportional to the measure for the actual value. This is precisely what a model can do: without actually knowing the actual value it is able to produce a model value that is identical, proportional or at least stationarily linearly proportional to the actual value. As the stationary transfer characteristic of the power unit is approximately linear, the already known control variable $V_{out}$ can under certain conditions replace the actual output variable $I_{out}$ as the input variable in the model: as the control variable for the conditioning current source, which represents the model since—as already demonstrate above—it is just as linear as the so-called path, the actual power unit. The adaptation of the absolute values of the modelled signals to the overall system primarily takes place through the already introduced conversion rate of the conditioning current source.

In contrast to the path the model operates ideally. The total voltage level on CL is thus composed of two fundamentally linearly proportional voltage components, of which the smaller part is real, i.e. error-prone due to time constants or level offsets for example, and the larger part is ideal. Closed control loops always concern themselves with the errors.

Figure 6:
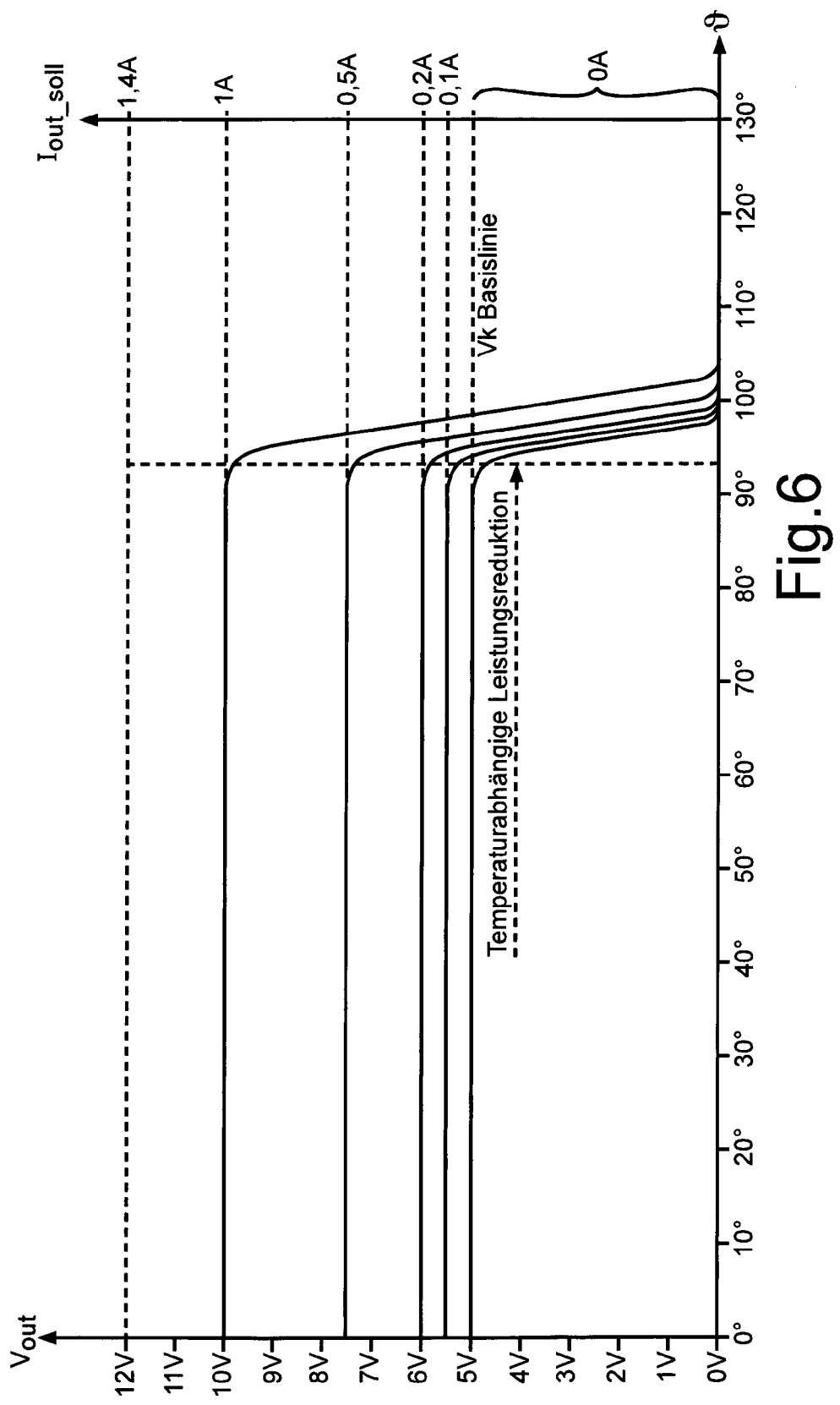
FIG. 6 shows a characteristic curve field for the circuit according to FIG. 5.
Figure 7:
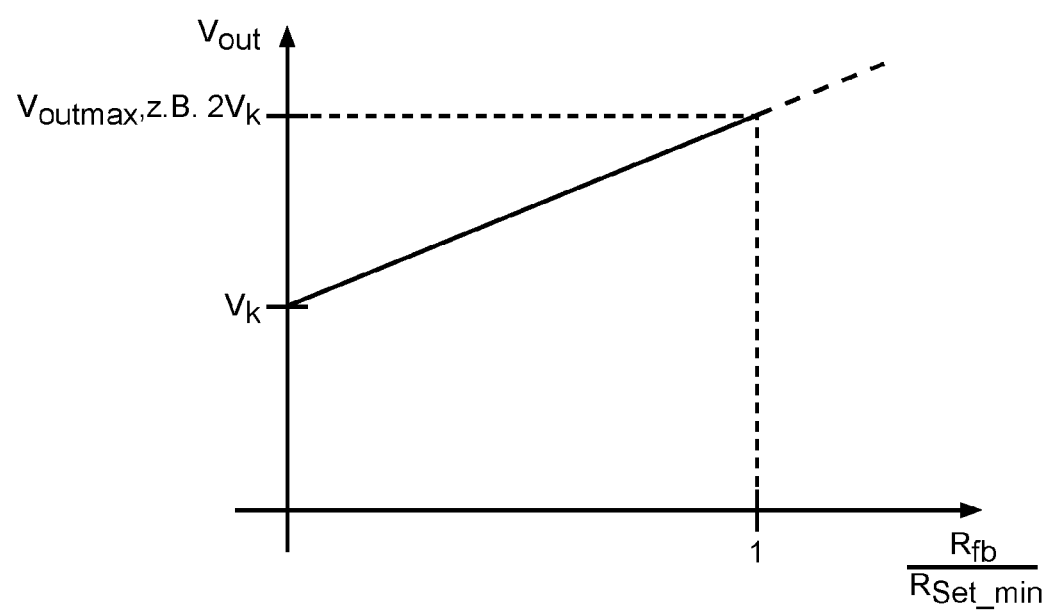
FIG. 7 shows a characteristic curve field of the current measuring unit for the circuit according to FIG. 5.

Idealized additions do not hinder the identifiability of the errors and can even improve it, as a result of which the overall functionality is in all events retained. The most frequent errors are level offsets or offset voltages. The most pronounced of such offsets can be seen in FIG. 6: although the LED operating current $I_{out}$ should be settable starting from zero, there are only control variables $V_{out}$ mainly above the value of the second voltage source $V_k$. The gate control circuit GD and the power current source CG usually exhibit an offset of their combined amplification, in other words the power unit figuratively only gets going when, starting from zero, the control variable $V_{out}$ at the input of the gate control circuit has reached a certain value. If this value coincidentally corresponds to an offset as described above, the control circuit immediately intervenes and no longer has to equalize anything. However, it can also happen that the power unit only starts to operate at $V_{out}$>7 V.

On switching on the power supply unit the control circuit produces an output voltage equal to the reference in the form of the second voltage source: $V_{out}=V_k$. This value is too small for starting the power unit, for which reason the measured actual value is too small and the amplifier "Contr" emits current in order to increase its output voltage. This current positively charges the capacitor $C_{PI}$ as a result of which $V_{out}$ increases until the power unit starts and through its action increases the actual value and thus moderates the control circuit. Inversely, however, the power unit can also already start to operate at $V_{out}=3$ V. An initial application of 5 V immediately leads to notable $I_{out}$ production which can be too large. Then the measured actual value is too great as a result of which the amplifier "Contr" takes up current, for which reason the capacitor $C_{PI}$ is negatively charged, $V_{out}$ and thus the actual value decrease and the control circuit is finally also moderated in this direction. This is the principle of automatic equalization of voltage offsets by the PI controller Contr of the power supply unit PSU. In order to also model this equalization on the part of the conditioning current source CCS, the offset voltage $V_{out}$ must also be provided and set accordingly. Thus, for a lighting system BEL designed for 100% operation the conditioning current source according to FIG. 10A suffices, where the value of $V_{off}$ must be set fairly precisely to the sum of the voltage of the second current source and the voltage integrated on the negative feedback capacitor $C_{PI}$ in the steady state.

For reasons relating to the stability, accuracy and resolution of the entire system BEL, it is necessary that the power unit of GD and CG, i.e. the path, and the conditioning current source CCS, i.e. the model, operate largely proportionally with regard to each other, not only in steady states but also during dynamic transitions. The gate control circuit GD and the power current source CG have a characteristic time constant and also a small dead time, which must also be compensated on the part of the conditioning current source CCS: for this reason a feedback capacitor $C_{fb}$ is introduced, as shown in both FIGS. 10A and 10B, which gives the conditioning current source CCS a slight PT1 behavior, i.e. a slight delaying behavior.

As, figuratively speaking, there is already one "adjusting input too few" for the presented light system BEL which has to be reconstructed from the conditioning current source (namely the total current requirement feedback), in order to carry out dimming, the approach is taken of modifying the value $V_k$ of the second voltage source which constitutes the reference.

As already stated above, it is precisely this second voltage source which represents the most pronounced voltage offset which must be compensated by adjusting $V_{off}$. If the value of the second voltage source $V_k$ can change, the setting of the fourth voltage source or offset voltage $V_{off}$ must be able to be changed at the same time.

The simplest possible solution for this is shown in FIG. 10B: the foot of the fourth voltage source is directly on the second voltage source, the feedback of the conditioning current source via $R_{adj}$ is automatically notified of every change to the value of the second voltage source $V_k$. Also suitable for dimming, the fourth voltage source can remain set at a constant value, namely approximately the value resulting on average over all operating points of the power supply unit PSU as the voltage on the negative feedback capacitor $C_{PI}$. The already mentioned feedback capacitor $C_{fb}$ in the conditioning current source CCS must be dimensioned slightly larger than in FIG. 10A as here it also has to shape the additional time constant through $R_k$ and $C_k$.

Figure 11A:
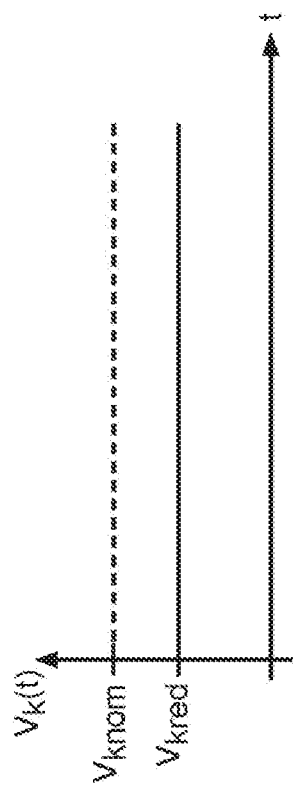
FIGS. 11A-11D show schematic views of the time course of the voltage Vk in undimmed operation (FIG. 11A) as well as for three different dimming variations (FIGS. 11B, 11C, 11D).
Figure 11B:
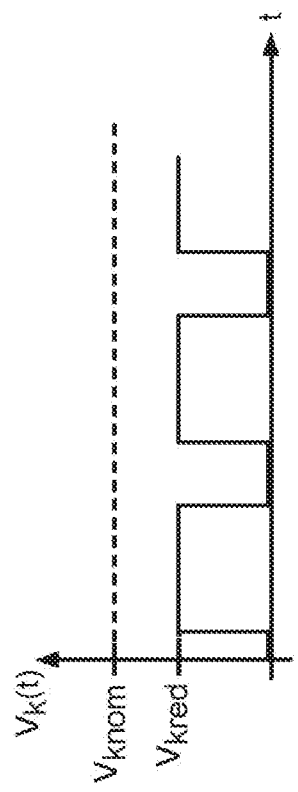
Figure 11C:
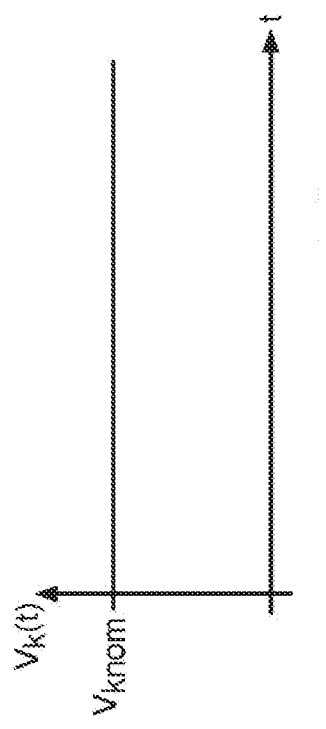
Figure 11D:
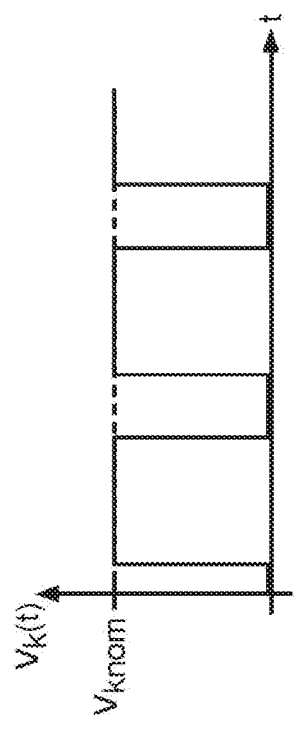

FIGS. 11A-11D show various methods of dimming a power supply unit PSU according to the present disclosure, namely through changing the voltage Vk. In connection with this, FIG. 11A shows a schematic view of the time course of the voltage Vk in the undimmed state, i.e. Vk is as constant as Vknom. A first dimming variant, see FIG. 11B, consists in leaving Vk constant, but reducing its amplitude to Vkred. In accordance with FIG. 11C dimming can also be achieved through pulse width modulation of the voltage Vk. FIG. 11A shows that a combination of pulse width modulation (PWM) with a reduction of the amplitude to Vkred is also possible. The PWM modulation frequency is preferably between 400 Hz and a few kHz.

This process is supported by an ultra-fast control loop, through which power switches on the output of the power supply unit PSU for PWM dimming of the connected modules and idle running phases of the power supply unit can be saved. However, in the system step response, crucial for PWM dimming, a remaining control circuit time constant brings about overshoots which cannot be avoided. Preferably these are not induced in the first place, for which reason as a gradient limiter a low pass filter, including the resistor $R_k$ and the capacitor $C_k$, with a time constant similar to the control circuit constant, is inserted between the voltage $V_k$ and the non-inverting input of the PI controller. This also promotes the initial switching on of the power supply unit PSU.

Deliberate mismatching of the parallel circuit of the resistors Rcc and Rcs, particularly slightly in the direction of the smaller values of the current $I_{CT}$, than described above, can effectively equalize voltage drops on the LED− line.

Equally deliberate mismatching of the capacitor $C_{fb}$ in the direction of smaller time constants of the conditioning current source CCS in comparison with the power unit, which includes the gate control circuit GD and the power current source CG, brings about a natural damping effect in the case of light level steps of the overall system.

Due to the power being switched off when the connection between the power supply unit PSU and light source module LEM is interrupted, the power supply unit PSU according to the present disclosure is "hot-plugging proof", i.e. it throttles its output current $I_{out}$ to zero as soon as the last light source module is disconnected and only starts again when the first light source module is reconnected. As result of this a further output power switch, which is normally additionally reserved for such special requirements, can be saved.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A light source module comprising:
   at least one LED cascade with a plurality of LEDs connected in series;
   a supply line for coupling to a current source, wherein at the input side the LED cascade is coupled to the supply line; and
   a ground line for coupling to a reference potential;
   wherein the light source module further comprises:
   a communications line for coupling to a control device for the current to be provided by the current source;
   a thermal derating unit which is coupled between a first voltage source and the communications line and comprises a temperature-sensitive element, wherein the thermal derating unit is designed to apply a temperature dependent current component determined in dependence on the temperature-sensitive element, to the communications line;
   at least one current measurement resistor, which, forming a coupling point, is connected in series between the at least one LED cascade and the reference potential, wherein the conductance of the current measurement resistor is proportional to the current requirement of the LED cascade; and
   at least one coupling resistor, which is coupled between the coupling point and the communications line.

2. The light source module as claimed in claim 1, wherein the light source module comprises several LED cascades connected in parallel, wherein each LED cascade is assigned one current measurement resistor and one coupling resistor.

3. The light source module as claimed in claim 1, wherein the conductance of the at least one coupling resistor is proportional to the current requirement of the LED cascade.

4. The light source module as claimed in claim 1, wherein the value of the at least one coupling resistor is identical for each LED cascade.

5. A power supply unit for operating at least one light source module,
   the light source module comprising:
   at least one LED cascade with a plurality of LEDs connected in series;
   a supply line for coupling to a current source, wherein at the input side the LED cascade is coupled to the supply line; and
   a ground line for coupling to a reference potential;
   wherein
   the light source module further comprises:
   a communications line for coupling to a control device for the current to be provided by the current source;
   a thermal derating unit which is coupled between a first voltage source and the communications line and comprises a temperature-sensitive element,
   wherein the thermal derating unit is designed to apply a temperature dependent current component determined in dependence on the temperature-sensitive element, to the communications line;
   at least one current measurement resistor, which, forming a coupling point, is connected in series between the at least one LED cascade and the reference potential, wherein the conductance of the current measurement resistor is proportional to the current requirement of the LED cascade; and
   at least one coupling resistor, which is coupled between the coupling point and the communications line,
   wherein
   the power supply unit (PSU) comprises:
   an output with a first and a second output connector, wherein the first output connector is coupled to the supply line of the at least one light source module, wherein the second output connector is coupled to the ground line of the at least one light source module;
   a communications connector which is coupled to the communications line of the at least one light source module;
   an adjustable current source, which on the output side is coupled to the first output connector and to the second output connector in order to provide an output current, wherein on the input side the current source has a control connector;
   a regulating switch which on the input side is coupled to the communications connector and on the output side to the control connector of the current source,
   wherein the regulating switch comprises a control circuit which is designed, as a function of the voltage signal on the communications connector, to determine a nominal value of the current to be provided by the current source, and through the voltage level on the communications line to regulate the actual value of the current provided by the current source in dependence on said nominal value, wherein the control circuit has a negative feedback designed in such a way that the control circuit does not influence the direct voltage value of the signal on the communications line.

6. The power supply unit as claimed in claim 5, wherein the regulating switch comprises a second voltage source as well as a first operational amplifier, wherein the second voltage source is coupled between the non-inverting connector of the first operational amplifier and the second output connector, wherein the inverting connector of the first operational amplifier is coupled to the communications connector.

7. The power supply unit as claimed in claim 6, wherein coupled between the output and the inverting input of the first operational amplifier is the series connection of an ohmic resistor and a capacitor.

8. The power supply unit as claimed in claim 6, wherein the regulating switch comprises a current source which is coupled to the inverting input of the first operational amplifier.

9. The power supply unit as claimed in claim 8, wherein the current source of the regulating switch is formed by a third voltage source which via an ohmic resistor is coupled to the inverting input of the first operational amplifier.

10. The power supply unit as claimed in claim 8, wherein the current source of the regulating switch is designed in such a way that its output current is linearly proportional to the voltage at the output of the first operational amplifier, wherein:

$$I_{CL} = Iout \frac{RMx}{RCx}$$

where $I_{CL}$ denotes the current at the output of the current source of the regulating switch, $I_{out}$ the output current of the controllable current source of the power supply unit, $R_{Mx}$ the current measurement resistor of the light source module x and $R_{Cx}$ the coupling resistor of the light source module x.

11. The power supply unit as claimed in claim 10, wherein the current source of the regulating switch comprises a second operational amplifier, a first, a second, a third, a fourth and a fifth ohmic resistor as well as a fourth voltage source, wherein the first ohmic resistor is coupled between the output of the first operational amplifier and the non-inverting input of the second operational amplifier, wherein the second ohmic resistor is coupled between the output of the second operational amplifier and the inverting input of the first operational amplifier, wherein the third ohmic resistor is coupled between the non-inverting input of the second operational amplifier and the inverting input of the first operational amplifier, wherein the fourth ohmic resistor is coupled between the output of the second operational amplifier and the inverting input thereof;

wherein the fifth ohmic resistor is coupled between the fourth voltage source and the inverting connector of the second operational amplifier.

12. The power supply unit as claimed in claim 11, wherein the negative input of the fourth voltage source is connected to the common ground line.

13. The power supply unit as claimed in claim 11, wherein the negative input of the fourth voltage source is connected to the positive input of the second voltage source.

14. The power supply unit as claimed in claim 11, wherein a capacitor is connected in parallel to the fourth ohmic resistor.

15. The power supply unit as claimed in claim 11, wherein the values of the first, the third and the fourth ohmic resistor are equal.

16. The power supply unit as claimed in claim 15, wherein the fifth ohmic resistor is selected:

$$Radj = \frac{Rcs^2}{Rcc + Rcs}$$

where $R_{adj}$ denotes the fifth ohmic resistor, Rcs the third ohmic resistor and Rcc the second ohmic resistor.

17. The power supply unit as claimed in claim 11, wherein the conductance of the second ohmic resistor is equivalent to the total conductance of all coupling resistors connected in parallel.

18. The power supply unit as claimed in claim 6, wherein the second voltage source is modulated.

19. The power supply unit as claimed in claim 6, wherein the power supply unit further comprises a low pass filter which is coupled between the second voltage source and the non-inverting input of the first operational amplifier.

20. A lighting system (BEL) comprising a power supply unit and at least one light source module which is connected to the power supply unit, the power supply unit being configured to operate the at least one light source module, the light source module comprising:
at least one LED cascade with a plurality of LEDs connected in series;
a supply line for coupling to a current source, wherein at the input side the LED cascade is coupled to the supply line; and
a ground line for coupling to a reference potential; wherein the light source module further comprises:
a communications line for coupling to a control device for the current to be provided by the current source;
a thermal derating unit which is coupled between a first voltage source and the communications line and comprises a temperature-sensitive element, wherein the thermal derating unit is designed to apply a temperature dependent current component determined in dependence on the temperature-sensitive element, to the communications line;
at least one current measurement resistor, which, forming a coupling point, is connected in series between the at least one LED cascade and the reference potential, wherein the conductance of the current measurement resistor is proportional to the current requirement of the LED cascade; and
at least one coupling resistor, which is coupled between the coupling point and the communications line, wherein
the power supply unit comprises:
an output with a first and a second output connector, wherein the first output connector is coupled to the supply line of the at least one light source module, wherein the second output connector is coupled to the ground line of the at least one light source module;
a communications connector which is coupled to the communications line of the at least one light source module;
an adjustable current source, which on the output side is coupled to the first output connector and to the second output connector in order to provide an output current, wherein on the input side the current source has a control connector;
a regulating switch which on the input side is coupled to the communications connector and on the output side to the control connector of the current source,
wherein the regulating switch comprises a control circuit which is designed, as a function of the voltage signal on the communications connector, to determine a nominal value of the current to be provided by the current source, and through the voltage level on the communications line to regulate the actual value of the current provided by the current source-in dependence on said nominal value, wherein the control circuit has a negative feedback designed in such a way that the control circuit does not influence the direct voltage value of the signal on the communications line.

* * * * *

UNITED STATES PATENT AND TRADEMARK OFFICE
CERTIFICATE OF CORRECTION

PATENT NO. : 9,560,702 B2
APPLICATION NO. : 15/029715
DATED : January 31, 2017
INVENTOR(S) : Felix Franck et al.

It is certified that error appears in the above-identified patent and that said Letters Patent is hereby corrected as shown below:

In the Specification

Column 7, Line 17: Please delete "$R_{sct}$" between the words "resistor" and "A", and write "$R_{set}$" in place thereof.

Column 7, Line 51: Please delete "$R_{sct1}$" between the words "via" and "or", and write "$R_{set1}$" in place thereof.

Column 7, Line 51: Please delete "$R_{sct}$" between the words "or" and "and", and write "$R_{set}$" in place thereof.

Column 7, Line 57: Please delete "$R_{sct1}$" between the words "of" and "and", and write "$R_{set1}$" in place thereof.

Column 7, Line 57: Please delete "$R_{sct}$" between the words "and" and "is", and write "$R_{set}$" in place thereof.

Column 9, Line 65: Please delete "$R_{sctmin}$" between the words "Rfb/RsetMin" and "is", and write "$R_{setmin}$" in place thereof.

Column 10, Line 1: Please delete "$R_{sctmin}$" between the words "Rfb=" and "the", and write "$R_{setmin}$" in place thereof.

Signed and Sealed this
Sixth Day of June, 2017

Michelle K. Lee
*Director of the United States Patent and Trademark Office*